(12) United States Patent
Oosawa et al.

(10) Patent No.: US 10,046,744 B2
(45) Date of Patent: Aug. 14, 2018

(54) BRAKE APPARATUS

(71) Applicant: Hitachi Automotive Systems, Ltd., Hitachinaka-shi, Ibaraki (JP)

(72) Inventors: Toshiya Oosawa, Yokohama (JP); Asahi Watanabe, Kawasaki (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 0 days.

(21) Appl. No.: 15/123,744

(22) PCT Filed: Mar. 9, 2015

(86) PCT No.: PCT/JP2015/056788
§ 371 (c)(1),
(2) Date: Sep. 6, 2016

(87) PCT Pub. No.: WO2015/146557
PCT Pub. Date: Oct. 1, 2015

(65) Prior Publication Data
US 2017/0015290 A1 Jan. 19, 2017

(30) Foreign Application Priority Data
Mar. 25, 2014 (JP) .................... 2014-061476

(51) Int. Cl.
*B60T 7/04* (2006.01)
*B60T 8/94* (2006.01)
(Continued)

(52) U.S. Cl.
CPC .............. *B60T 8/94* (2013.01); *B60T 7/042* (2013.01); *B60T 8/4081* (2013.01);
(Continued)

(58) Field of Classification Search
CPC ...... B60T 7/042; B60T 8/4081; B60T 8/4827; B60T 8/92; B60T 13/146; B60T 13/662;
(Continued)

(56) References Cited

U.S. PATENT DOCUMENTS 8,246,122 B2 * 8/2012 Yamamoto ............ B60T 8/4081
303/122.03
8,888,197 B2 * 11/2014 Miyazaki .............. B60T 8/4081
303/116.2
(Continued)

FOREIGN PATENT DOCUMENTS

DE     100 64 392 A1    6/2002
JP     2008-222169 A    9/2008
(Continued)

OTHER PUBLICATIONS

International Search Report (PCT/ISA/210) issued in PCT Application No. PCT/JP2015/056788 dated May 26, 2015 with English translation (Four (4) pages).
(Continued)

*Primary Examiner* — Thomas W Irvin
(74) *Attorney, Agent, or Firm* — Crowell & Moring LLP

(57) ABSTRACT

An object of the present invention is to provide a brake apparatus capable of acquiring a stable brake performance. A brake apparatus includes a master cylinder configured to be activated according to a brake operation performed by a driver, a reservoir tank divided into at least a first chamber connected to a wheel cylinder via the master cylinder and a second chamber connected to a hydraulic source configured to increase a pressure of brake fluid and transmit the brake fluid to the wheel cylinder, a brake control unit configured to perform brake control of transmitting the brake fluid to the wheel cylinder, and a fluid level detection unit configured to detect a fluid level of the brake fluid in the reservoir tank. The brake control unit is provided so as to be able to perform
(Continued)

first brake control of transmitting the brake fluid from the first chamber to the wheel cylinder with use of the master cylinder, thereby increasing a pressure in this wheel cylinder, and second brake control of transmitting the brake fluid in the second chamber to the wheel cylinder with use of the hydraulic source, thereby increasing a pressure in this wheel cylinder. The brake control unit switches brake control between the first brake control and the second brake control according to the fluid level detected by the fluid level detection unit.

13 Claims, 9 Drawing Sheets

(51) Int. Cl.
    *B60T 13/14*     (2006.01)
    *B60T 13/66*     (2006.01)
    *B60T 13/68*     (2006.01)
    *B60T 8/40*     (2006.01)
    *B60T 8/48*     (2006.01)

(52) U.S. Cl.
    CPC .......... *B60T 8/4827* (2013.01); *B60T 13/146* (2013.01); *B60T 13/662* (2013.01); *B60T 13/686* (2013.01); *B60T 2270/403* (2013.01); *B60T 2270/82* (2013.01)

(58) Field of Classification Search
    CPC ............. B60T 13/686; B60T 2270/403; B60T 2270/82
    See application file for complete search history.

(56) References Cited

U.S. PATENT DOCUMENTS

| | | | |
|---|---|---|---|
| 8,944,526 B2* | 2/2015 | Nishioka | B60T 7/042 |
| | | | 303/14 |
| 9,004,613 B2* | 4/2015 | Miyazaki | B60T 7/042 |
| | | | 303/6.01 |
| 9,061,669 B2* | 6/2015 | Miyazaki | B60T 8/4081 |
| 9,139,185 B2* | 9/2015 | Mayer | B60T 8/4072 |
| 9,199,622 B2* | 12/2015 | Okano | B60T 8/48 |
| 9,358,964 B2* | 6/2016 | Ito | B60T 8/4081 |
| 9,365,199 B2* | 6/2016 | Drumm | B60T 8/3655 |
| 9,434,367 B2* | 9/2016 | Higashi | B60T 13/16 |
| 9,834,189 B2* | 12/2017 | Jung | B60T 8/4081 |
| 2007/0035179 A1* | 2/2007 | Kling | B60T 8/4081 |
| | | | 303/122.09 |
| 2012/0038209 A1 | 2/2012 | Yamamoto | |
| 2013/0249274 A1* | 9/2013 | Miyazaki | B60T 7/042 |
| | | | 303/6.01 |
| 2016/0375886 A1* | 12/2016 | Jung | B60T 13/686 |
| | | | 303/15 |
| 2017/0217418 A1* | 8/2017 | Ganzel | B60T 13/745 |
| 2018/0050670 A1* | 2/2018 | Feigel | B60T 7/042 |

FOREIGN PATENT DOCUMENTS

| | | |
|---|---|---|
| JP | 2009-40359 A | 2/2009 |
| JP | 2009-113605 A | 5/2009 |
| JP | 2010-280331 A | 12/2010 |
| JP | 2011-6027 A | 1/2011 |
| JP | 2011-201469 A | 10/2011 |

OTHER PUBLICATIONS

Japanese-language Written Opinion (PCT/ISA/237) issued in PCT Application No. PCT/JP2015/056788 dated May 26, 2015 (Four (4) pages).
Extended European Search Report issued in counterpart European Application No. 15769145.2 dated May 19, 2017 (Ten (10) pages).

* cited by examiner

BRAKE APPARATUS

TECHNICAL FIELD

The present invention relates to a brake apparatus mountable on a vehicle.

BACKGROUND ART

Conventionally, there has been known a brake apparatus including a hydraulic source capable of increasing a pressure in a wheel cylinder independently of a master cylinder. For example, a brake apparatus discussed in PTL 1 uses a detected value of a hydraulic pressure in a flow passage of hydraulic fluid to detect an outward leak of the hydraulic fluid.

CITATION LIST

Patent Literature

PTL 1: Japanese Patent Application Public Disclosure No. 2008-222169

SUMMARY OF INVENTION

Technical Problem

However, the conventional brake apparatus cannot highly accurately detect the leak of the hydraulic fluid, thereby involving a risk that the brake apparatus may be unable to acquire a stable brake performance. An object of the present invention is to provide a brake apparatus capable of acquiring the stable brake performance.

Solution to Problem

To achieve the above-described object, a brake apparatus according to one aspect of the preset invention is preferably configured to switch brake control between brake control using the master cylinder and brake control using the hydraulic source according to a detected fluid level in a reservoir tank.

Advantageous Effects of Invention

Therefore, the stable brake performance can be acquired.

DESCRIPTION OF EMBODIMENTS

In the following description, embodiments for embodying a brake apparatus according to the present invention will be described with reference to the drawings.

[First Embodiment]
[Configuration]

Figure 1:
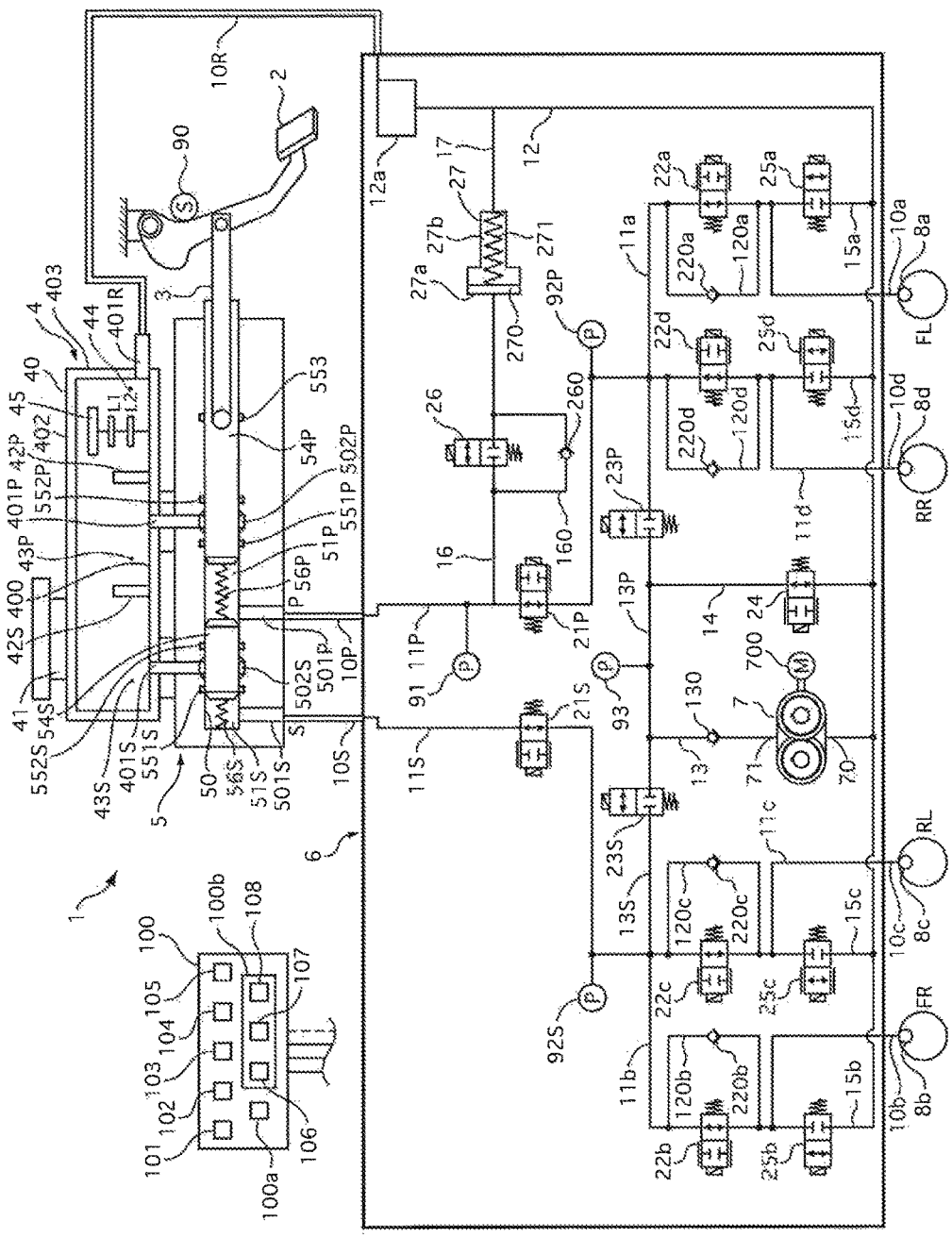
FIG. 1 schematically illustrates a configuration of a brake apparatus according to a first embodiment.

First, a configuration will be described. FIG. 1 illustrates a schematic configuration of a brake apparatus (hereinafter referred to as an apparatus 1) according to a first embodiment together with a hydraulic circuit of a hydraulic unit 6. A master cylinder 5 is illustrated in cross-section taken along an axial direction (in partial cross-section taken along a plane passing through an axis). The apparatus 1 is a hydraulic brake apparatus preferably usable for a brake system of an electric vehicle, such as a hybrid automobile including a rotational motor (a motor generator) besides an internal combustion engine (an engine) and an electric automobile including only the rotational motor, as a prime mover for driving wheels. Such an electric vehicle can carry out regenerative braking, which brakes the vehicle by regenerating electric energy from motion energy of the vehicle with use of a regenerative braking apparatus including the rotational motor. The apparatus 1 generates a brake hydraulic pressure (a wheel cylinder pressure) by supplying brake fluid as hydraulic fluid into a wheel cylinder 8 mounted on each of wheels FL to RR of the vehicle. By this operation, the apparatus 1 applies a hydraulic braking force to each of the wheels FL to RR.

The apparatus 1 includes two oil passage systems (a primary P system and a secondary S system), and employs, for example, an X-type dual circuit configuration. Hereinafter, when a member provided in correspondence with the P system and a member provided in correspondence with the S system should be distinguished from each other, indices P and S will be added at the ends of their respective reference numerals.

The apparatus 1 includes a brake pedal 2, a push rod 3, a reservoir tank (hereinafter referred to as a reservoir) 4, the master cylinder 5, the hydraulic unit (a braking control unit) 6, and an electronic control unit (hereinafter referred to as an ECU) 100. The brake pedal 2 is a brake operation member that receives an input of a brake operation performed by an operator (a driver). A pedal stroke sensor 90 is mounted on the brake pedal 2. The pedal stroke sensor 90 detects a pedal stroke as an amount of the operation performed on the brake pedal 2 by the driver. The push rod 3 is a brake operation transmission member rotatably connected to the brake pedal 2. The reservoir 4 is a brake fluid source that stores the brake fluid, and is a low-pressure portion opened to an atmospheric pressure. The master cylinder 5 is connected to the brake pedal 2 via the push rod 3, and is also replenished with the brake fluid from the reservoir 4. The master cylinder 5 is activated by the operation performed on the brake pedal 2 by the driver (the brake operation), and generates a brake hydraulic pressure (a master cylinder pressure) according to the brake operation amount. The master cylinder 5 is a so-called tandem-type master cylinder, and includes a primary piston 54P connected to the push rod 3 and a secondary piston 54S configured as a free piston, as master cylinder pistons axially displaceable according to the brake operation performed by the driver. The apparatus 1 does not include a negative pressure-type booster (hereinafter referred to as a negative-pressure booster) that boosts or amplifies a brake operation force (a pedal pressing force) by utilizing an intake negative pressure generated by the engine of the vehicle.

The hydraulic unit 6 receives supply of the brake fluid from the reservoir 4 or the master cylinder 5, and generates a brake hydraulic pressure independently of the brake operation performed by the driver. The hydraulic unit 6 is provided between the wheel cylinders 8 and the master cylinder 5, and can supply the master cylinder pressure or a control hydraulic pressure to each of the wheel cylinders 8 individually. The hydraulic unit 6 includes a pump 7 and a plurality of control valves (electromagnetic valves 21 and the like) as hydraulic devices (actuators) for generating the control hydraulic pressure. The pump 7 is rotationally driven by a motor 700 to introduce the brake fluid therein, and discharge the brake fluid toward the wheel cylinders 8. In other words, the pump 7 increases a pressure of the brake fluid in the reservoir 4 and transmits this brake fluid to the wheel cylinders 8. In the present embodiment, the pump 7 is embodied by a gear pump excellent in terms of a noise and vibration performance and the like, in particular, an external gear pump. The pump 7 is used in common by both the systems, and is driven by the common motor 700. The motor 700 can be embodied by, for example, a brushed motor. Electromagnetic valves 22 and the like are each opened and closed according to a control signal, thereby switching a communication state of an oil passage to control a flow of the brake fluid. The hydraulic unit 6 includes a stroke simulator 27, which is provided so as to be able to increase the pressures in the wheel cylinders 8 with the aid of the hydraulic pressure generated by the pump 7, and also creates the pedal stroke according to the brake operation performed by the driver, with the master cylinder 5 and the wheel cylinders 8 kept out of communication with each other. Further, the hydraulic unit 6 includes hydraulic sensors 91 to 93, which detect a pressure discharged by the pump 7 and the master cylinder pressure, respectively.

The ECU 100 is an electronic control unit that controls the actuation of the hydraulic unit 6, and forms the brake control unit. Detected values transmitted from the pedal stroke sensor 90 and the hydraulic sensors 91 to 93 and information regarding a running state transmitted from the vehicle are input to the ECU 100, and the ECU 100 controls each of the actuators in the hydraulic unit 6 based on a program installed therein. By this operation, the ECU 100 controls the hydraulic pressures in the wheel cylinders 8. In other words, the ECU 100 performs brake control of transmitting the brake fluid to the wheel cylinders 8, and returning the brake fluid from the wheel cylinders 8. More specifically, the ECU 100 controls opening/closing operations of the electromagnetic valves 21 and the like, and the number of times that the motor 700 rotates while driving the pump 7 (i.e., an amount discharged by the pump 7). By this operation, the ECU 100 realizes boosting control for reducing a required brake operation force, anti-lock brake control (hereinafter referred to as ABS) for preventing or reducing a slip of the wheel that might be caused when the vehicle is braked, brake control for controlling a motion of the vehicle (vehicle behavior stabilization control such as electronic stability control, which will be hereinafter referred to as ESC), automatic brake control such as adaptive cruise control, regenerative cooperative brake control that controls the wheel cylinder pressures so as to achieve a target deceleration (a target braking force) by collaborating with the regenerative brake, and the like. In the boosting control, the ECU 100 drives the hydraulic unit 6 to create higher wheel cylinder pressures than the master cylinder pressure (with use of the pressure discharged by the pump 7), thereby generating a hydraulic braking force corresponding to insufficiency of the brake operation force input by the driver, when the driver performs the brake operation. This control allows the apparatus 1 to exert a boosting function that assists the brake operation. In other words, the apparatus 1 is provided so as to be able to assist the brake operation force by activating the hydraulic unit 6 (the pump 7) as compensation for the absence of the negative-pressure booster. In the regenerative cooperative brake control, the ECU 100 generates a hydraulic braking force corresponding to insufficiency, of a regenerative braking force generated by the regenerative braking apparatus, for example, to generate the braking force requested by the driver.

A main body portion 40 of the reservoir 4 is formed into a bottomed cylindrical shape capable of storing the brake fluid therein. An opening 41 for feeding the brake fluid is formed at an upper portion 402 of the main body portion 40 that would become a top when the main body portion 40 is mounted on the vehicle. A cap for closing the opening 41 is fixedly fitted in this opening 41. A lower side of an interior of the reservoir 4 is divided into a first storage chamber 43 and a second storage chamber 44. The first reservoir chamber 43 is further divided into two storage chambers 43P and 43S. A first partition wall 42P and a second partition wall 42S are set up at a bottom portion 400 of the main body portion 40, which would become a bottom when the main body portion 40 is mounted on the vehicle. These partition walls 42P and 42S are each set up in a protruding manner by a predetermined length (height) not long enough to reach an inner wall of the upper portion 402 (which would become the top surface when the main body portion 40 is mounted on the vehicle) so as to extend upwardly from an inner wall of the bottom portion 400 (which would become the bottom surface when the main body portion 40 is mounted on the vehicle). The second partition wall 42S may be shorter in length than the first partition wall 42P. The interior of the reservoir 4 is partitioned and divided into the first storage chamber 43 and the second storage chamber 44 by the first partition wall 42P. The first storage chamber 43 is partitioned and divided into the storage chambers 43P and 43S by the second partition wall 42S. The above-described predetermined length of the first partition wall 42P (a height of an upper end of the first partition wall 42P) is set to a value that allows the first storage chamber 43 (as a source replenishing the brake fluid to the master cylinder 5) to hold a brake fluid amount sufficient to stably generate appropriate braking forces at the above-described wheels by the brake fluid supplied from the master cylinder 5 toward the wheel cylinders 8 on the wheels of each of the systems P and S. Further, the above-described predetermined length of the first partition wall 42P is set to a value that allows the second storage chamber 44 (as a source replenishing the brake fluid to the pump 7) to hold a brake fluid amount sufficient to stably generate appropriate braking forces at the above-described wheels by the brake fluid supplied toward the wheel cylinders 8 on the four wheels by the pump 7. A replenishment port 401P is provided at the bottom portion 400 so as to be opened to a bottom surface of the storage chamber 43P, and a replenishment port 401S is also provided at the bottom portion 400 so as to be opened to a bottom surface of the storage chamber 43S. Further, a replenishment port 401R is provided at a side portion 403 of the main body portion 40 so as to be opened to a lower side of a side surface of the second storage chamber 44 (immediately above a bottom surface of the second storage chamber 44).

A not-illustrated highest fluid level, a first fluid level L1, and a second fluid level L2 are set in the main body portion 40 as fluid levels serving as references. The highest fluid level is set to a value lower than the top surface of the main body portion 40 (the inner wall of the upper portion 402) in consideration of the brake fluid returned from a brake pipe 10R to the reservoir 4. The first fluid level L1 is set to detect a fall of the fluid level in the entire reservoir 4 in a higher region than the first partition wall 42P, and is set to a position that allows the reservoir 4 to hold the brake fluid amount sufficient to stably apply appropriate hydraulic braking forces to the wheel cylinders 8 on the four wheels. The first fluid level L1 is set to a position lower than the highest fluid level and generally the same as or slightly higher than the upper end of the first partition wall 42P. In other words, the first fluid level L1 is set to a position higher than the above-described predetermined length of the first partition wall 42P upwardly from the inner wall of the bottom portion 40. A lower space than the first fluid level L1 is divided into the three storage chambers 43P, 43S and 44. The second fluid level L2 is set to detect an extreme fall of the fluid level in the second storage chamber 44 with which an intake oil passage 12 is in communication, and is set to a position lower than the first fluid level L1 and the upper end of the first partition wall 42P in the second storage chamber 44. The second fluid level L2 is set to a position slightly higher than the opening of the replenishment port 401R so as to allow the apparatus 1 to prevent or reduce inclusion of air into the brake fluid introduced and then discharged by the pump 7 (detect the fluid level immediately before an increase in a probability of the inclusion of the air. The positions of the fluid levels L1 and L2 and the above-described predetermined length of the first partition wall 42P are preset by an experiment, a simulation, and/or the like.

A fluid level sensor 45 is provided in the reservoir 4. The fluid level sensor 45 is a fluid level detection unit that detects the fluid level of the brake fluid in the reservoir 4. The fluid level sensor 45 is set on a second storage chamber side where the second storage chamber 44 is located, i.e., is set across the inside of the second storage chamber 44 and a space above that. The fluid level sensor 45 is provided so as to be able to detect the fluid level in the space not defined by the first partition wall 42P and the second partition wall 42S, i.e., the fluid level higher than the storage chambers 43 and 44, and also detect the fluid level in the second storage chamber 44. The fluid level sensor 45 is, for example, a fluid level (detection) switch LIS, and includes a fixed member and a floating member and discretely detects the fluid level. The fixed member is fixed to the main body portion 40 of the reservoir 4, and includes a plurality of switches. The switches are provided at positions at generally same heights as the fluid levels L1 and L2. The floating member has buoyancy in the brake fluid, and is provided so as to be vertically displaceable relative to the fixed member according to an increase and reduction in the brake fluid amount (the fluid level). When the brake fluid amount in the reservoir 4 reduces and the floating member (located at the generally same position as the fluid level) is displaced so as to drop to the fluid level L1, the switch provided at the fixed member is switched from an OFF state to an ON state. By this switching, the fluid level L1 is detected (the fall of the fluid level in the reservoir 4 to L1 is detected). The fluid level L2 is also detected in a similar manner (the fall of the fluid level L2 in the second storage chamber 44 to L2 is detected). The specific configuration of the fluid level sensor 45 is not limited to the configuration that discretely detects the fluid level in the above-described manner (the switch), and may be a configuration that continuously detects the fluid level (analog detection).

The master cylinder 5 is connected to the wheel cylinders 8 via first oil passages 11, which will be described below, and is a first (manual) hydraulic source capable of increasing the wheel cylinder pressures. The master cylinder 5 can increase the pressures in the wheel cylinders 8a and 8d, and the like via an oil passage (a first oil passage 11P) of the P system with use of the master cylinder pressure generated in a first hydraulic chamber 51P, and can also increase the pressures in the wheel cylinders 8b and 8c, and the like via an oil passage (a first oil passage 11S) of the S system with use of the master cylinder pressure generated by a second hydraulic chamber 51S. The pistons 54P and 54S of the master cylinder 5 are inserted in a cylinder 50 so as to be axially displaceable along an inner peripheral surface of the bottomed cylindrical cylinder 50. The first hydraulic chamber 51P is formed between the pistons 54P and 54S. The second hydraulic chamber 51S is formed between the piston 54S and an axial end of the cylinder 50. A coil spring 56 as a return spring is set in each of the hydraulic chambers 51 in a pressed and compressed state. The cylinder 50 includes a discharge port (a supply port) 501 and a replenishment port 502 for each of the P and S systems. The discharge port 501 is provided so as to be connectable to the hydraulic unit 6 to be communicable with the wheel cylinders 8. The replenishment port 502 is connected to the reservoir 4 and is in communication with the reservoir 4. The discharge ports 501P and 501S are constantly opened to the first and second fluid chambers 51P and 51S, respectively. The replenishment ports 502P and 502S are connected to the replenish port 401P of the reservoir 4 and the replenishment port 401S of the reservoir 4, respectively.

Piston seals 55 are provided on an inner periphery of the cylinder 50. The piston seals 55 are a plurality of seal members that seal between respective outer peripheral surfaces of the pistons 54P and 54S and the inner peripheral surface of the cylinder 50 while being in sliding constant with the pistons 54P and 54S, respectively. Each of the piston seals 55 (although not illustrated in FIG. 1 and the like) is a well-known seal member (a cup seal) cup-shaped in cross-section that includes a lip portion on an inner diameter side, and permits a flow of the brake fluid in one direction with the lip portion in sliding contact with the outer peripheral surface of the piston 54 while prohibiting or reducing a flow of the brake fluid in another direction. Focusing on the P system, a first piston seal 551P is disposed in an orientation that permits a flow of the brake fluid from the replenishment port 502P toward the first hydraulic chamber 51P (the discharge port 501P) while prohibiting or reducing a flow of the brake fluid in an opposite direction. A second piston seal 552P is disposed in an orientation that permits a flow of the brake fluid toward the replenishment port 502P while prohibiting or reducing an outflow of the brake fluid from the replenishment port 502P. The same applies to the S system. A third piston seal 553 is disposed in an orientation that prohibits or reduces a flow of the brake fluid from the replenishment port 502P to the outside of the cylinder 50.

In the following description, the brake hydraulic circuit of the apparatus 1 will be described with reference to FIG. 1. Members corresponding to the individual wheels FL to RR will be distinguished from one another if necessary, by indices a to d added at the ends of reference numerals thereof, respectively. FIG. 1 illustrates an initial state (an inactivated state) with no power supplied to each of the actuators. The first oil passages 11 connect the discharge ports 501 (the first and second hydraulic chambers 51P and 51S) of the master cylinder 5 and the wheel cylinders 8 to each other, respectively. The discharge ports 501P and 501S, and the first oil passages 11P and 11S on a hydraulic unit side where the hydraulic unit 6 is located are connected to each other via brake pipes 10P and 10S, respectively. First oil passages 11a to 11d on the hydraulic unit side where the hydraulic unit 6 is located, and the wheel cylinders 8a to 8d are connected to each other via brake pipes (wheel cylinder pipes) 10a to 10d, respectively. The brake pipes 10P, 10S, and 10a to 10d form a part of the first oil passages 11. Shut-off valves 21 are normally-opened (opened when no power is supplied) electromagnetic valves respectively provided in the first oil passages 11. Pressure-increase valves (hereinafter referred to as IN valves) 22 are normally-opened electromagnetic valves respectively provided (in the oil passages 11a to 11d) in correspondence with the wheels FL to RR on a wheel cylinder side closer to the wheel cylinders 8 with respect to the shut-off valves 21 in the first oil passages 11.

The intake oil passage 12 connects the replenishment port 401R of the reservoir 4 and an intake portion 70 of the pump 7 to each other. The replenishment port 401R of the reservoir 4 and the intake oil passage 12 on the hydraulic unit side where the hydraulic unit 6 is located are connected to each other via a brake pipe 10R. The brake pipe 10R forms a part of the intake oil passage 12. The second storage chamber 44 of the reservoir 4 is connected to the pump 7 (the intake portion 70) via the replenishment port 401R and the intake oil passage 12 (the brake pipe 10R), i.e., without intervention of the hydraulic chambers 51 of the master cylinder 5. The replenishment port 401R of the reservoir 4 may be provided so as to be opened to the bottom portion 400 of the main body portion 40 of the reservoir 4. In this case, the apparatus 1 may be configured in such a manner that the intake oil passage 12 constructed by including the brake pipe 10R passes through the inside (an arbitrary portion other than the hydraulic chambers 51, such as an outer peripheral side of the piston 54P) of the cylinder 50 of the master cylinder 5. A fluid pool 12a having a predetermined volume is provided in the intake oil passage 12 in the hydraulic unit 6. The fluid pool 12a is provided in the vicinity of a portion of the hydraulic unit 6 to which the brake pipe 10R is connected (a vertically upper side of the hydraulic unit 6). The pump 7 introduces the brake fluid therein via the fluid pool 12a.

A discharge oil passage 13 connects portions in the first oil passages 11 between the shut-off valves 21 and the IN valves 22, and the discharge portion 71 of the pump 7 to each other. A check valve 130 is a discharge valve of the pump 7, and is provided in the discharge oil passage 13. The check valve 130 permits only a flow of the brake fluid from a discharge portion side where the discharge portion 71 is located to a first oil passage side where the first oil passages 11 are located. A communication valve 23P is a normally-closed (closed when no power is supplied) electromagnetic valve provided in a discharge oil passage 13P connecting a downstream side of the check valve 130 and the first oil passage 11P of the P system to each other. A communication valve 23S is a normally-closed electromagnetic valve provided in the discharge oil passage 13S connecting the downstream side of the check valve 130 and the first oil passage 11S of the S system to each other. The discharge oil passages 13P and 13S form a communication passage connecting the first oil passage 11P of the P system and the first oil passage 11S of the S system to each other. The pump 7 is connected to the wheel cylinders 8a to 8d via the above-described communication passages (the discharge oil passages 13P and 13S) and the first oil passages 11P and 11S. The pump 7 is a second (power) hydraulic source capable of increasing the pressures in the wheel cylinders 8a to 8d by discharging the brake fluid to the above-described communication passages (the discharge oil passages 13P and 13S), respectively. A first pressure-reduction oil passage 14 connects a portion in the discharge oil passage 13P between the check valve 130 and the communication valve 23P, and the intake oil passage 12 to each other. A pressure adjustment valve 24 is a normally-opened electromagnetic valve serving as a first pressure-reduction valve provided in the first pressure-reduction oil passage 14. Second pressure-reduction oil passages 15 connect wheel cylinder sides of the first oil passages 11 that are closer to the wheel cylinders 8 with respect to the IN valves 22 in the first oil passages 11, and the intake oil passage 12 to each other, respectively. Pressure-reduction valves (hereinafter referred to as OUT valves) 25 are normally-closed electromagnetic valves serving as second pressure-reduction valves respectively provided in the second pressure-reduction oil passages 15.

The stroke simulator 27 includes a piston 270 and a spring 271. The piston 270 divides an inside of a cylinder into two chambers (a primary chamber or positive-pressure chamber 27a, and an auxiliary chamber or back-pressure chamber 27b), and is provided so as to be axially displaceable in the cylinder. The spring 271 is an elastic member set in the back-pressure chamber 27b in a pressed and compressed state, and constantly biasing the piston 270 toward a positive-pressure chamber side where the positive-pressure chamber 27a is located (in a direction for reducing a volume of the positive-pressure chamber 27a and increasing a volume of the back-pressure chamber 27b). A first simulator oil passage 16 branches off from a portion in the first oil passage 11P between the master cylinder 5 (the first hydraulic chamber 51P) and the shut-off valve 21P to be connected to the positive-pressure chamber 27a of the stroke simulator 27. A stroke simulator valve 26 is a normally-closed electromagnetic valve as a simulator shut-off valve provided in the first simulator oil passage 16. A second simulator oil passage 17 connects the back-pressure chamber 27b of the stroke simulator 27 and the intake oil passage 12 to each other.

At least one of the shut-off valve 21, the IN valves 22, the pressure adjustment valve 24, and the OUT valves 25 of one of the systems (the OUT valves 25c and 25d of the rear wheels RL and RR in the present embodiment) is a proportional control valve, an opening degree of which is adjusted according to a current supplied to a solenoid. The other valves, i.e., the communication valves 23, the other OUT valves 25 (the OUT valves 25a and 25b of the front wheels FL and FR), and the stroke simulator valve 26 are ON/OFF valves, opening/closing of which is controlled to be switched between two values, i.e., switched to be either opened or closed. The above-described other valves can also be embodied by the proportional control valve.

A bypass oil passage 160 is provided in parallel with the first simulator oil passage 16 while bypassing the stroke simulator valve 26. A check valve 260 is provided in the bypass oil passage 160. The check valve 260 is a one-way valve that permits only a flow of the brake fluid from the positive-pressure chamber side where the positive-pressure chamber 27a of the stroke simulator 27 is located toward a first oil passage side where the first oil passage 11P is located. Further, bypass oil passages 120 are provided in parallel with the first oil passages 11 while bypassing the IN valves 22, respectively. A check valve 220 is provided in each of the bypass passages 120. The check valve 220 permits only a flow of the brake fluid from the wheel cylinder side where the wheel cylinders 8 are located toward a master cylinder side where the master cylinder 5 is located.

A hydraulic sensor 91 is provided at a portion in the first oil passage 11P between the master cylinder 5 (the first hydraulic chamber 51P) and the shut-off valve 21P. The hydraulic sensor 91 detects a hydraulic pressure at this portion (the master cylinder pressure). Hydraulic sensors 92 are provided at portions in the first oil passages 11 between the shut-off valves 21 and the IN valves 22, respectively. The hydraulic sensors 92 detect hydraulic pressures at these portions, respectively (the wheel cylinder pressures, or a pressure in the primary system and a pressure in the secondary system). A hydraulic sensor 93 is provided at a portion in the discharge oil passage 13P between the discharge portion 71 (the check valve 130) of the pump 7 and the communication valve 23P. The hydraulic sensor 93 detects a hydraulic pressure at this portion (the pressure discharged by the pump).

The brake system (the first oil passages 11) respectively connecting the first and second hydraulic chambers 51P and 51S of the master cylinder 5 and the wheel cylinders 8 to each other with the shut-off valves 21 controlled in their respective valve-opening directions forms a first system that creates the wheel cylinder pressures with the aid of the master cylinder pressure generated with use of the pedal pressing force, thereby realizing the pressing force braking (non-boosting control). On the other hand, the brake system (the intake oil passage 12, the discharge oil passages 13, and the like) including the pump 7 and connecting the reservoir 4 and the wheel cylinders 8 to each other with the shut-off valves 21 controlled in their respective valve-closing directions forms a second system that creates the wheel cylinder pressures with the aid of the hydraulic pressure generated with use of the pump 7, and forms a so-called brake-by-wire system that realizes the boosting control, the regenerative cooperative control, and the like.

The brake fluid transmitted out of the master cylinder 5 (the first hydraulic chamber 51P) into the first oil passage 11P is introduced into the positive-pressure chamber 27a via the first simulator oil passage 16 with the shut-off valve 21 controlled in its valve-closing direction and the master cylinder 5 and the wheel cylinders 8 out of communication with each other, by which the stroke simulator 27 creates the pedal stroke. More specifically, when a hydraulic pressure (the master cylinder pressure) equal to or higher than a predetermined pressure is applied to a pressure-receiving surface of the piston 270 in the positive-pressure chamber 27a, the piston 270 is displaced axially toward a back-pressure chamber side where the back-pressure chamber 27b is located while pressing and compressing the spring 271, causing an increase in the volume of the positive-pressure chamber 27a. As a result, the brake fluid is introduced from the master cylinder 5 (the discharge port 501P) into the positive-pressure chamber 27a1 via the oil passages (the first oil passage 11P and the first simulator oil passage 16), and the brake fluid is also discharged from the back-pressure chamber 27b into the intake oil passage 12 via the second simulator oil passage 17. When the pressure in the positive-pressure chamber 27a1 reduces to lower than the predetermined pressure, the piston 270 is returned to an initial position under a biasing force (an elastic force) of the sprint 271. The stroke simulator 27 introduces the brake fluid transmitted from the master cylinder 5 therein while generating a reaction force with use of the spring 271 in this manner, thereby simulating hydraulic stiffness of the wheel cylinders 8 to imitate a feeling that the driver would have when pressing the pedal.

Next, a control configuration of the apparatus 1 will be described. The ECU 100 includes a brake operation amount detection unit 101, a target wheel cylinder pressure calculation unit 102, a pressing force brake creation unit 103, a (two systems) boosting control unit 104, a reservoir fluid level detection unit 105, a normal brake control unit 100a, and a fail-safe control unit 100b. The brake operation amount detection unit 101 detects a displacement amount of the brake pedal 2 (the pedal stroke) as the brake operation amount upon receiving an input of the value detected by the stroke sensor 90. The stroke sensor 90 is not limited to a sensor that directly detects the displacement amount of the brake pedal 2, and may be a sensor that detects a displacement amount of the push rod 3. Alternatively, the apparatus 1 may be provided with a pressing force sensor that detects the pressing force applied to the brake pedal 2, and configured to detect the brake operation amount based on a value detected by this pressing force sensor. In other words, not only the pedal stroke but also another appropriate variable may be used as the brake operation amount to be used in the control.

The target wheel cylinder pressure calculation unit 102 calculates target wheel cylinder pressures as target hydraulic pressures in the wheel cylinders 8. Basically, the target wheel cylinder pressure calculation unit 102 calculates, based on the detected pedal stroke, the target wheel cylinder pressures that realize a predetermined boosting rate, i.e., an ideal characteristic about a relationship between the pedal stroke and the brake hydraulic pressure requested by the driver (a vehicle deceleration G requested by the driver). In the present embodiment, for example, the above-described ideal characteristic about the relationship for calculating the target wheel cylinder pressures is defined to be a predetermined characteristic about the relationship between the pedal stroke and the wheel cylinder pressures (the brake hydraulic pressures) that is realized when a brake apparatus including the negative-pressure booster normal in size actuates the negative-pressure booster. Further, at the time of the regenerative cooperative brake control, the target wheel cylinder pressure calculation unit 102 calculates the target wheel cylinder pressures in relation to the regenerative braking force. At the time of the ESC, the target wheel cylinder pressure calculation unit 102 calculates the respective target wheel cylinder pressures for the wheels FL to RR so as to realize a desired state of a vehicle motion based on, for example, a detected vehicle motion state (a lateral acceleration or the like).

When the brake operation amount detection unit 101 detects that the brake operation is performed by the driver, the pressing force brake creation unit 103 controls the shut-off valves 21 in their respective valve-opening directions to thus bring the hydraulic unit 6 into the state capable of creating the wheel cylinder pressures with the aid of the master cylinder pressure (the first system), thereby realizing the pressing force brake. Further, the pressing force brake creation unit 103 controls the stroke simulator valve 26 in its valve-closing direction, thereby blocking the communication between the master cylinder 5 and the stroke simulator 27. This pressing force brake control increases the pressures in the wheel cylinders 8 by supplying the brake fluid from the master cylinder 5 actuated (according to the brake operation performed by the driver) into the wheel cylinders 8. In other words, the pressing force brake control is first brake control, which increases the pressures in the wheel cylinders 8 with use of the brake fluid in the first storage chamber 43 of the reservoir 4 according to the brake operation performed by the driver.

When the driver performs the brake operation, the boosting control unit 104 controls the shut-off valves 21 in their respective valve-closing directions to thus bring the hydraulic unit 6 into the state capable of creating the wheel cylinder pressures with the aid of the pump 7 (the second system), thereby performing the boosting control with respect to both the P and S systems. The boosting control unit 104 controls each of the actuators of the hydraulic unit 6 according to the operation performed on the brake pedal 2 by the driver, thereby realizing the target wheel cylinder pressure with respect to each of the wheel cylinders 8. Further, the boosting control unit 104 controls the stroke simulator valve 26 in its valve-opening direction, thereby establishing the communication between the master cylinder 5 and the stroke simulator 27. This boosting control is second brake control, which increases the pressures in the wheel cylinders 8 by supplying the brake fluid from the activated pump 7 into the wheel cylinder 8, i.e., increases the pressures in the wheel cylinders 8 with use of the brake fluid in the second storage chamber 44 of the reservoir 4.

The reservoir fluid level detection unit 105 detects whether the fluid level (i.e., the fluid amount) of the brake fluid in the reservoir 4 falls below each of the first and second fluid levels L1 and L2 upon receiving an input of the value detected by the fluid level sensor 45.

When the fluid level in the reservoir 4 is detected to be equal to or higher than the first fluid level L1 (detected to be the fluid level at normal times), the normal brake control unit 100*a* controls the activation of the hydraulic unit 6 to thus switch the brake control between the above-described pressing force brake control and boosting control, thereby performing normal brake control. In a broad sense, the normal brake control refers to control that generates, at the vehicle, the deceleration according to the amount of the brake operation performed by the driver. In a narrow sense, the normal brake control refers to the following control performed by the normal brake control unit 100*a*. That is, when the brake operation amount detection unit 101 detects a start of the brake operation, the normal brake control unit 100*a* causes the pressing force brake creation unit 103 to create the wheel cylinder pressures if the calculated target wheel cylinder pressures are equal to or lower than a predetermined value (for example, corresponding to a maximum value of the vehicle deceleration G that would be generated when the vehicle is normally braked without being suddenly braked). On the other hand, the normal brake control unit 100*a* causes the boosting control unit 104 to create the wheel cylinder pressures if the target wheel cylinder pressures calculated at the time of the brake operation exceed the above-described predetermined value. In this manner, at the beginning of the braking in which the brake operation amount is relatively small, i.e., in a predetermined brake operation region (a low-pressure region) after the brake operation is started, the normal brake control unit 100*a* creates the wheel cylinder pressures basically with use of the first system. In a predetermined brake operation region (a high-pressure region) in which the brake operation amount is relatively large, the normal brake control unit 100*a* creates the wheel cylinder pressures with use of the second system, thereby realizing the boosting function.

When the fluid level in the reservoir 4 is detected to fall below the first fluid level L1, the fail-safe control unit 100*b* controls the activation of the hydraulic unit 6 to switch the brake control between the above-described pressing force brake control and (two systems) boosting control, or performs single system boosting control, thereby realizing fail-safe control. More specifically, the fail-safe control unit 100*b* includes a failed system detection control unit 106, a reservoir fluid amount reduction stop/cut-down control unit 107, and a single system boosting control unit 108.

The failed system detection control unit 106 is a fluid leak estimation unit that estimates or detects in which system the fluid leaks in the oil passage, the P system or the S system, when the fluid level in the reservoir 4 is detected to fall below the first fluid level L1 (i.e., there is a possibility that the brake fluid in the apparatus 1 leaks outwardly). The above-described oil passages targeted by the estimation of the fluid leak include the oil passages provided in correspondence with each of the P system and the S system, in particular, the first oil passages 11, the second pressure-reduction oil passages 15, and the like. Example of how the fluid leaks specifically include a leak of the brake fluid from the brake pipes 10*a* to 10*d* forming the first oil passages 11 (and portions where the brake pipes 10*a* to 10*d* are connected to the hydraulic unit 6), and the like. When the fluid level in the reservoir 4 is detected to fall below the first fluid level L1 yet be equal to or higher than the second fluid level L2, the failed system detection control unit 106 controls the activation of the hydraulic unit 6 to confine the brake fluid in the oil passages per system to detect in which system the hydraulic pressure reduces, thereby carrying out the above-described estimation or detection (hereinafter simply referred to as detection).

The reservoir fluid amount reduction stop/cut-down control unit 107 performs control of stopping or cutting down a reduction in the brake fluid in the reservoir 4 by switching the brake control between the above-described pressing force brake control and the boosting control as a part of the fail-safe control, at the time of the normal brake control (in the broad sense). More specifically, if the above-described detection by the failed system detection control unit 106 is not realized (the failed system cannot be determined) when the fluid level in the reservoir 4 is detected to fall below the first fluid level L1 yet be equal to or higher than the second fluid level L2, the reservoir fluid amount reduction stop/cut-down control unit 107 performs first reduction stop/cut-down control, which is control for stopping or cutting down a reduction in the brake fluid in the first storage chamber 43. In the first reduction stop/cut-down control, the reservoir fluid amount reduction stop/cut-down control unit 107 prohibits (stops) the pressing force brake control, and permits (performs) only the (two systems) boosting control. More specifically, the reservoir fluid amount reduction stop/cut-down control unit 107 increases the pressures in the wheel cylinders 8 by the pump 7 with use of the brake fluid in the second reservoir chamber 44 without use of the first storage chamber 43 in the reservoir 4. When the fluid level in the reservoir 4 is detected to fall below the second fluid level L2, the reservoir fluid amount reduction stop/cut-down control unit 107 performs second reduction stop/cut-down control, which is control for stopping or cutting down a reduction in the brake fluid in the second storage chamber 44 regardless of whether the above-described detection by the failed system detection control unit 106 is realized. In the second reduction stop/cut-down control, the reservoir fluid amount reduction stop/cut-down control unit 107 prohibits (stops) the boosting control and permits (performs) only the pressing force brake control. More specifically, the reservoir fluid amount reduction stop/cut-down control unit 107 increases the pressures in the wheel cylinders 8 with use of the brake fluid in the first storage chamber 43 without use of the second storage chamber 44 of the reservoir 4, i.e., by the master cylinder 5 activated according to the brake operation performed by the driver. In this manner, the reservoir fluid amount reduction stop/cut-down control unit 107 switches the brake control between the pressing force control and the boosting control according to the detected fluid level. By this control, the reservoir fluid amount reduction stop/cut-down control unit 107 prevents or reduces deterioration of the brake performance at the time of the normal brake control (in the broad sense) while stopping or cutting down the reduction in the brake fluid in the reservoir 4 due to the fluid leak.

The single system boosting control unit 108 performs the single system boosting control, which is the boosting control using the oil passages of the system where the fluid leak is not detected, as a part of the fail-safe control at the time of the normal brake control (in the broad sense). More specifically, if the above-described detection by the failed system detection control unit 106 is realized (the failed system can be determined) when the fluid level in the reservoir 4 is detected to fall below the first fluid level L1 yet be equal to or higher than the second fluid level L2, the single system boosting control unit 108 prohibits (stops) the boosting control using the oil passages of the system where the fluid leak is detected, and permits (continues) the boosting control using the oil passages of the other system (i.e., the system where the fluid leak is not detected). Regarding the system where the fluid leak is detected, the single system boosting control unit 108 performs neither the pressing force brake control nor the boosting control, and does not increase the pressures in the wheel cylinders 8 (without transmitting the brake fluid) via the oil passages of this system. Regarding the system where the fluid leak is not detected, the single system boosting control unit 108 increases the pressures in the wheel cylinders 8 (by transmitting the brake fluid) by the pump 7 via the oil passages of this system according to the brake operation performed by the driver. By this control, the single system boosting control unit 108 prevents or reduces the deterioration of the brake performance at the time of the normal brake control (in the broad sense) while stopping or cutting down the reduction in the brake fluid in the apparatus 1 (the reservoir 4) due to the fluid leak.

Figure 2:
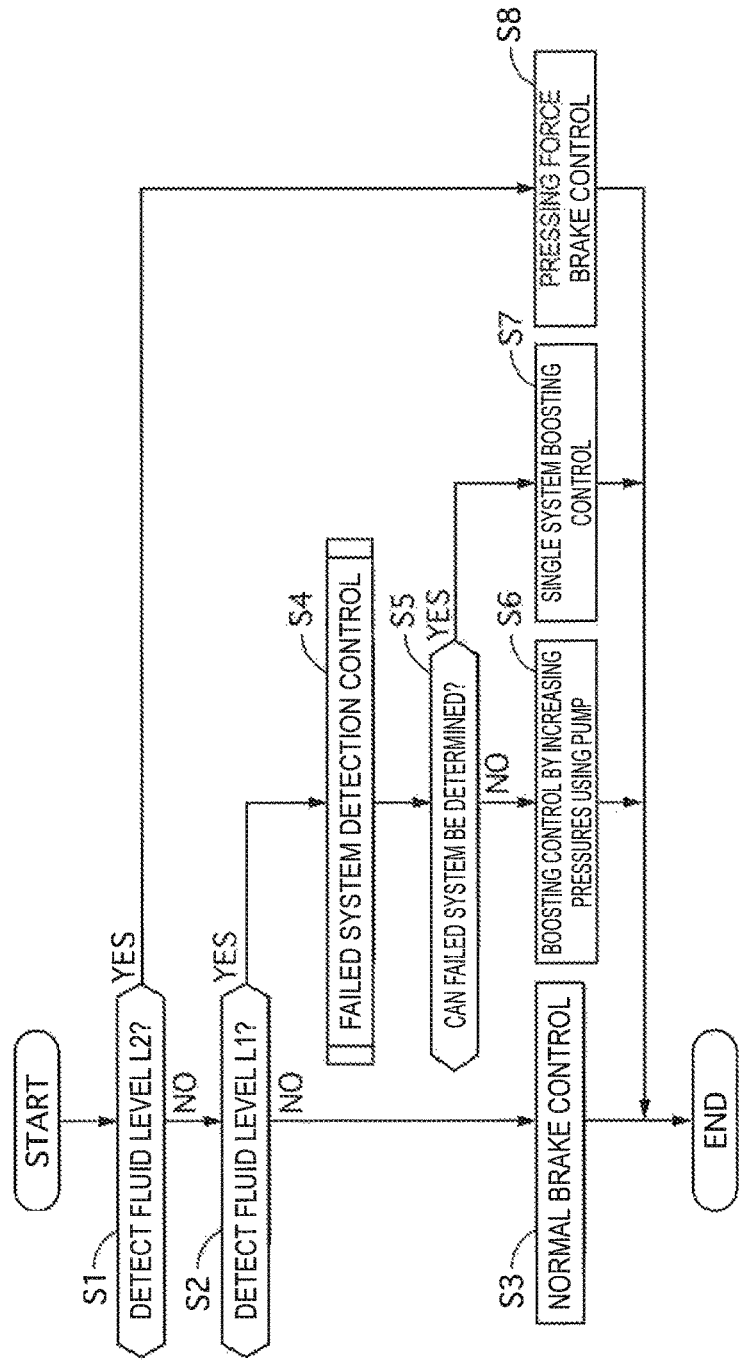
FIG. 2 is a flowchart illustrating a flow of control performed by the brake apparatus according to the first embodiment.

FIG. 2 is a flowchart illustrating an overview of a flow of the control performed by the ECU 100 at the time of the normal brake control (in the broad sense). This control flow is repeatedly performed per predetermined cycle. In step S1, the reservoir fluid level detection unit 105 detects whether the fluid level in the reservoir 4 falls below the second fluid level L2. If the reservoir fluid level detection unit 105 does not detect that the fluid level in the reservoir 4 falls below the second fluid level L2, the processing proceeds to step S2. If the reservoir fluid level detection unit 105 detects that the fluid level in the reservoir 4 falls below the second fluid level L2, the processing proceeds to step S8. In step S2, the reservoir fluid level detection unit 105 detects whether the fluid level in the reservoir 4 falls below the first fluid level L1. If the reservoir fluid level detection unit 105 does not detect that the fluid level in the reservoir 4 falls below the first fluid level L1, the processing proceeds to step S3. If the reservoir fluid level detection unit 105 detects that the fluid level in the reservoir 4 falls below the first fluid level L1, the processing proceeds to step S4. In step S1, the apparatus 1 may be configured in such a manner that the reservoir fluid level detection unit 105 detects whether the fluid level matches or falls below the second fluid level L2, i.e., if the fluid level reduces from a higher level than the second fluid level L2 to the second fluid level L2, instead of determining whether the fluid level falls below the second fluid level L2. The same applies to the detection regarding the first fluid level L1 in step S2.

In step S3, the normal brake control unit 100a performs the normal brake control (in the narrow sense). In step S4, the fail-safe control unit 100b (the failed system detection control unit 106) detects in which system the fluid leaks in the oil passage. A specific content of this detection control will be described below. After that, the processing proceeds to step S5. In step S5, the fail-safe control unit 100b detects whether the above-described detection is realized. If the above-described detection is not realized (the failed system cannot be determined), the processing proceeds to step S6. If the above-described detection is realized (the failed system can be determined), the processing proceeds to step S7. In step S6, the fail-safe control unit 100b (the reservoir fluid amount reduction stop/cut-down control unit 107) performs the (two systems) boosting control. In step S7, the fail-safe control unit 100b (the single system boosting control unit 108) performs the above-described single system boosting control. In step S8, the fail-safe control unit 100b (the reservoir fluid amount reduction stop/cut-down control unit 107) performs the pressing force brake control.

Figure 3:
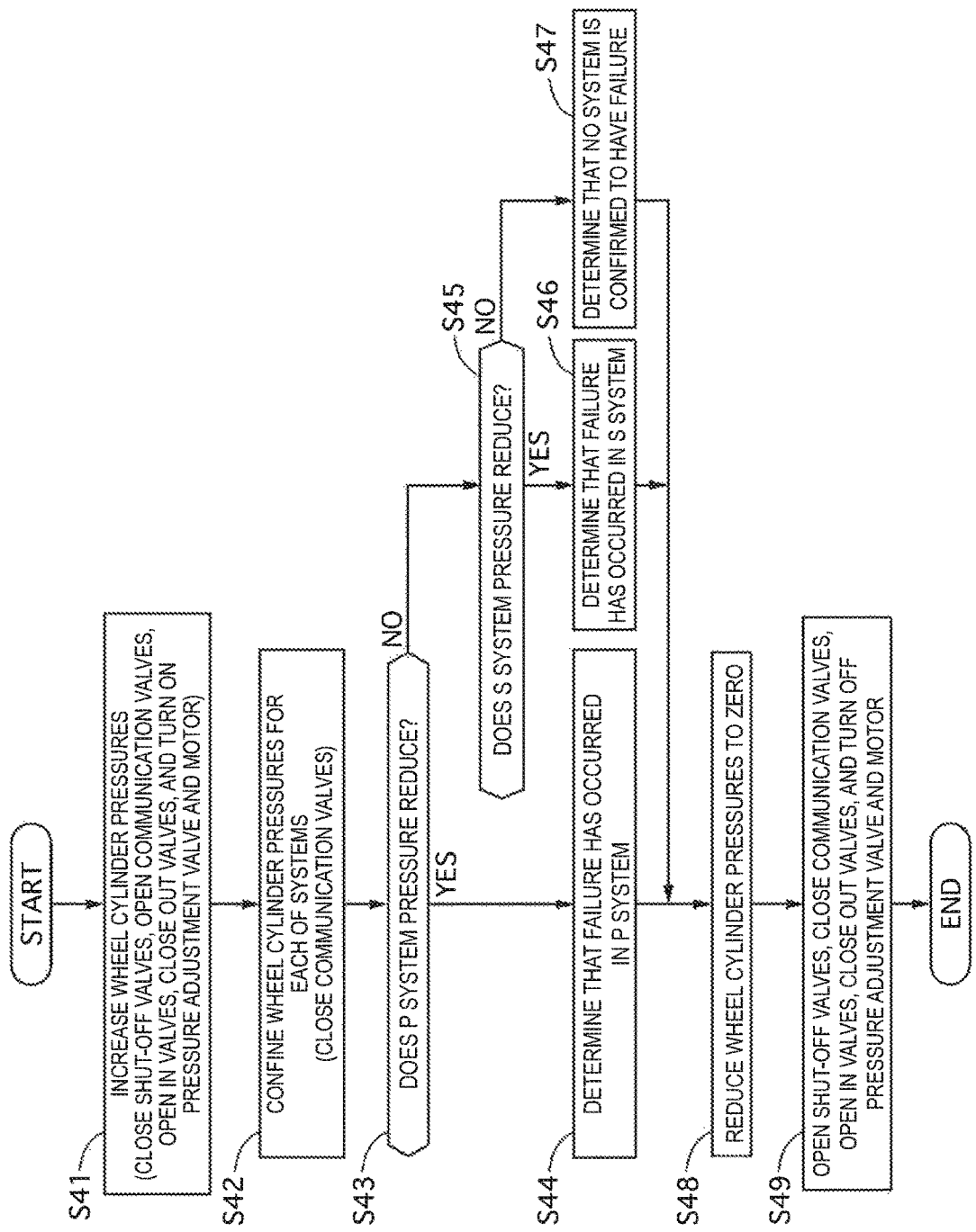
FIG. 3 is a flowchart illustrating a flow of failed system detection control performed by the brake apparatus according to the first embodiment.

FIG. 3 is a flowchart illustrating an overview of a flow of the detection control performed by the failed system detection control unit 106. This detection control is performed under such a situation that a transitional brake operation is not performed, for example, when the driver is not pressing the brake pedal 2. This timing relatively facilitates a determination about a change in the pressure. However, the detection control is not limited thereto, and the apparatus I may be configured in such a manner that the failed system detection control unit 106 performs the present detection control when the driver is pressing the brake pedal 2, for example, when predetermined wheel cylinder pressures are held during the normal brake control. Further, although it is preferable to perform the present detection control while the vehicle is stopped, the present detection control may be performed while the vehicle is running.

In step S41, the failed system detection control unit 106 controls the shut-off valves 21, the OUT valves 25, and the stroke simulator valve 26 in their respective valve-closing directions, controls the IN valves 22 and the communication valves 23 of the both systems in their respective valve-opening directions, controls a valve-opening state of the pressure adjustment valve 24, and drives the motor 700. By these operations, the failed system detection control unit 106 increases the pressures in the wheel cylinders 8 on the four wheels to a predetermined value. After that, the processing proceeds to step S42. In the case where the present detection control is performed when the driver is pressing the brake pedal 2, the failed system detection control unit 106 prevents or reduces deterioration of the pedal feeling by controlling the stroke simulator valve 26 in its valve-opening direction. In step S42, the failed system detection control unit 106 confines the hydraulic pressures in the wheel cylinders 8 on the four wheels (the hydraulic pressures in the oil passages in communication with the wheel cylinders 8) for each of the systems, by controlling the communication valves 23 of the both systems in their respective valve-closing directions.

After that, the processing proceeds to step S43. In step S43, the failed system detection control unit 106 detects whether the pressure in the P system reduces. More specifically, if the value detected by the hydraulic sensor 92P of the P system falls below a predetermined threshold value by the time that a predetermined time period has elapsed since a start of the confinement of the wheel cylinder pressures on the four wheels for each of the systems, the failed system detection control unit 106 determines that the pressure in the P system significantly reduces. Then, the processing proceeds to step S44. Otherwise, the processing proceeds to step S45. The apparatus 1 may be configured in such a manner that the failed system detection control unit 106 detects whether the pressure in the P system reduces, based on, for example, whether an amount of the reduction in the value detected by the hydraulic sensor 92P since immediately after the confinement reaches or exceeds a predetermined threshold value, or whether a difference between the value detected by the hydraulic sensor 92P and the value detected by the hydraulic sensor 92S (a differential pressure between the systems) reaches or exceeds a predetermined threshold value. The same applies to step S45, which will be described below.

In step S44, the failed system detection control unit 106 determines that a failure of the fluid leak has occurred in the oil passage of the P system. After that, the processing proceeds to step S48. In step S45, the failed system detection control unit 106 detects whether the pressure in the S system reduces. For example, the failed system detection control unit 106 determines that the pressure in the S system significantly reduces if the value detected by the hydraulic sensor 92S in the S system falls below the above-described predetermined threshold value by the time that the above-described predetermined time period has elapsed since the start of the confinement of the wheel cylinder pressures on the four wheels for each of the systems. Then, the processing proceeds to step S46. Otherwise, the processing proceeds to step S47. In step S46, the failed system detection control unit 106 determines that a failure of the fluid leak has occurred in the oil passage of the S system. After that, the processing proceeds to step S48. In step S47, the failed system detection control unit 106 determines that no system is confirmed to have a failure of fluid leak that has occurred in the oil passage. After that, the processing proceeds to step S48. In step S48, the failed system detection control unit 106 reduces the wheel cylinder pressures on the four wheels to zero to end the present detection control. More specifically, the failed system detection control unit 106 controls the OUT valves 25 for the four wheels in their respective valve-opening directions. After that, the processing proceeds to step S49. In step S49, the failed system detection control unit 106 controls the OUT valves 25 for the four wheels and the communication valves 23 of the both systems in their respective valve-closing directions, controls the shut-off valves 21, the IN valves 22, the pressure adjustment valve 24, and the stroke simulator valve 26 in their respective valve-opening directions, and stops driving the motor 700. By these operations, the failed system detection control unit 106 ends the present detection control.

[Functional Advantages]

Next, functional advantages will be described. The apparatus 1 does not include the negative-pressure booster, and is provided so as to be able to compensate for the insufficiency of the brake operation force with use of another energy source than that (the hydraulic unit 6). Therefore, the apparatus 1 can be easily applied to electric vehicles. Further, in the case where the apparatus 1 is applied to vehicles including the engine, the fuel efficiency can be improved. Further, a hydraulic unit for the ABS and the ESC is already provided to many brake apparatuses, and the apparatus 1 uses the above-described hydraulic unit 6 as the energy source for compensating for the insufficiency of the brake operation force instead of the negative-pressure booster. Therefore, the preset embodiment can reduce the number of parts to cut down the cost and can also simplify the configuration of the apparatus 1 to improve mountability onto the vehicle. Further, the present embodiment can realize reductions in the size and the weight of the vehicle, thereby improving the energy efficiency of the vehicle.

Further, the apparatus 1 refrains from activating the hydraulic unit 6 as the boosting device at the time of the normal brake control, which generates the deceleration according to the amount of the brake operation performed by the driver, in the predetermined brake operation region (the low-pressure region) where the brake operation is relatively frequently performed. In other words, the apparatus 1 first increases the pressures in the wheel cylinders 8 with use of the master cylinder pressure generated by the brake operation (the pedal pressing force) upon detecting the brake operation. Therefore, the preset embodiment can save energy for driving the hydraulic unit 6, thereby improving the energy efficiency by an amount as large as the saved energy, compared to constantly activating the hydraulic unit 6 (the pump 7 or the motor 700 as the hydraulic source) as the boosting device according to the brake operation performed by the driver. The apparatus 1 may be configured to include a mechanical boosting device, such as a link-type boosting device, between the brake pedal 2 and the master cylinder 5. In this case, the apparatus 1 can improve the energy efficiency for the same reason as described above and can also acquire a desired boosting rate even in the above-described predetermined brake operation region (the low-pressure region), by achieving the boosting function with use of the brake operation force (the pedal pressing force) exerted by the driver.

Figure 4:
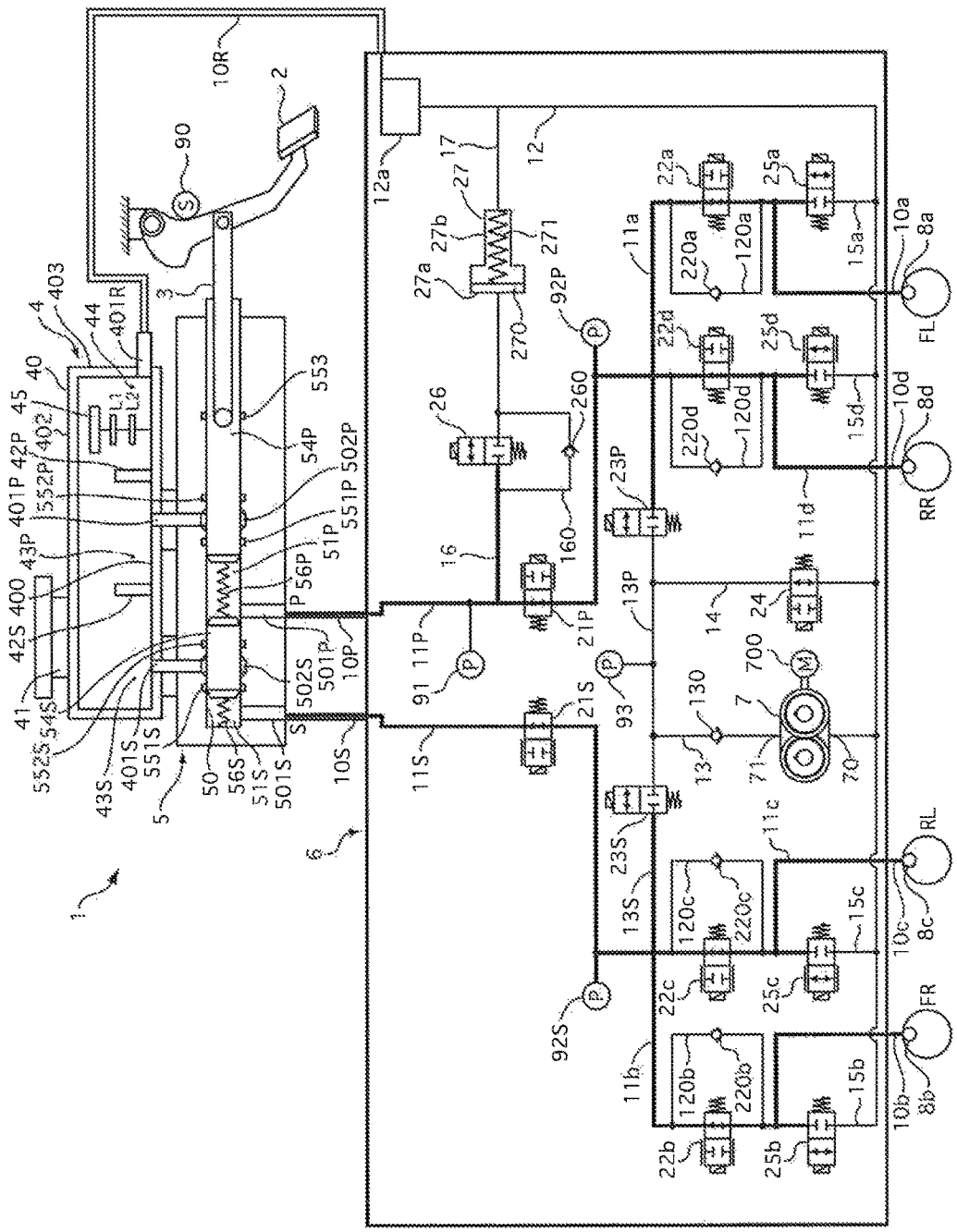
FIG. 4 illustrates an activation state at the time of pressing force brake control performed by the brake apparatus according to the first embodiment.

FIGS. 4 to 6 and 8 are similar drawings to FIG. 1 except for omission of the illustration of the ECU 100, and each illustrate activation states of the actuators of the hydraulic unit 6 and a flow of the brake fluid at the time of each of the controls. FIG. 4 illustrates how the apparatus 1 operates at the time of the pressing force brake control performed by the pressing force brake creation unit 103. FIG. 4 illustrates the pressing force brake when the fluid level in the reservoir 4 reaches or exceeds the first fluid level L1 (at the time of the normal brake control in the narrow sense) as one example. The pressing force brake creation unit 103 inactivates (stops the power supply to) each of the actuators (the pump 7, the electromagnetic valves 21, and the like). This inactivation causes the brake fluid to be directly supplied from the master cylinder 5 into the wheel cylinders 8a to 8d via the first oil passages 11. The brake fluid (the master cylinder pressure) is supplied from the first hydraulic chamber 51P of the master cylinder 5 into the wheel cylinders 8a and 8d via the first oil passage 11P of the P system. When the pressures in the wheel cylinders 8a to 8d reduce, the bypass oil passages 120a and 120d and the check valves 220a and 220d provided in parallel with the IN valves 22a and 22d, respectively, facilitate the flow of the brake fluid returning from the wheel cylinder side where the wheel cylinders 8a and 8d are located to the master cylinder side where the master cylinder 5 is located (the first hydraulic chamber 51P). The brake fluid is replenished from the first storage chamber 43P of the reservoir 4 by an amount as much as the insufficiency in the first hydraulic chamber 51P. The same applies to the S system.

More specifically, when the piston 54 in the master cylinder 5 carries out the stroke toward an axially opposite side from the brake pedal 2 according to the operation of pressing the brake pedal 2 by the driver, the respective volumes of the first and second hydraulic chambers 51P and 51S reduce. As a result, the hydraulic pressures (the master cylinder pressure) are generated in the first and second hydraulic chambers 51P and 51S, and the brake fluid is supplied from the first and second hydraulic chambers 51P and 51S toward the wheel cylinders 8 via the discharge ports 510, respectively. Generally same hydraulic pressures are generated in the first and second hydraulic chambers 51P and 51S between the P system and the S system. When the piston 54 carries out the stroke toward a brake pedal side where the brake pedal 2 is located according to the operation of returning the pressed brake pedal 2 by the driver, the respective volumes of the first and second hydraulic chambers 51P and 51S increase. At this time, the brake fluid is returned from the individual wheel cylinders 8 into the first and second hydraulic chambers 51P and 51S via the first oil passages 11 and the discharge ports 501, respectively. Then, the storage chamber 43P of the reservoir 4 is connected to the primary system oil passage 11P, which supplies the pressures into the wheel cylinders 8a and 8d, via the master cylinder 5 (the first hydraulic chamber 51P thereof). The storage chamber 43S is connected to the secondary system oil passage 11S, which supplies the pressures into the wheel cylinders 8b and 8c, via the master cylinder 5 (the second hydraulic chamber 51S thereof). When the brake fluid amount returned from the wheel cylinders 8a and 8d to the first hydraulic chamber 51P is insufficient, the brake fluid is replenished from the storage chamber 43P into the first hydraulic chamber 51P via the replenishment ports 401P and 502P. The same applies to the replenishment of the brake fluid from the storage chamber 43S into the second hydraulic chamber 51S.

Figure 5:
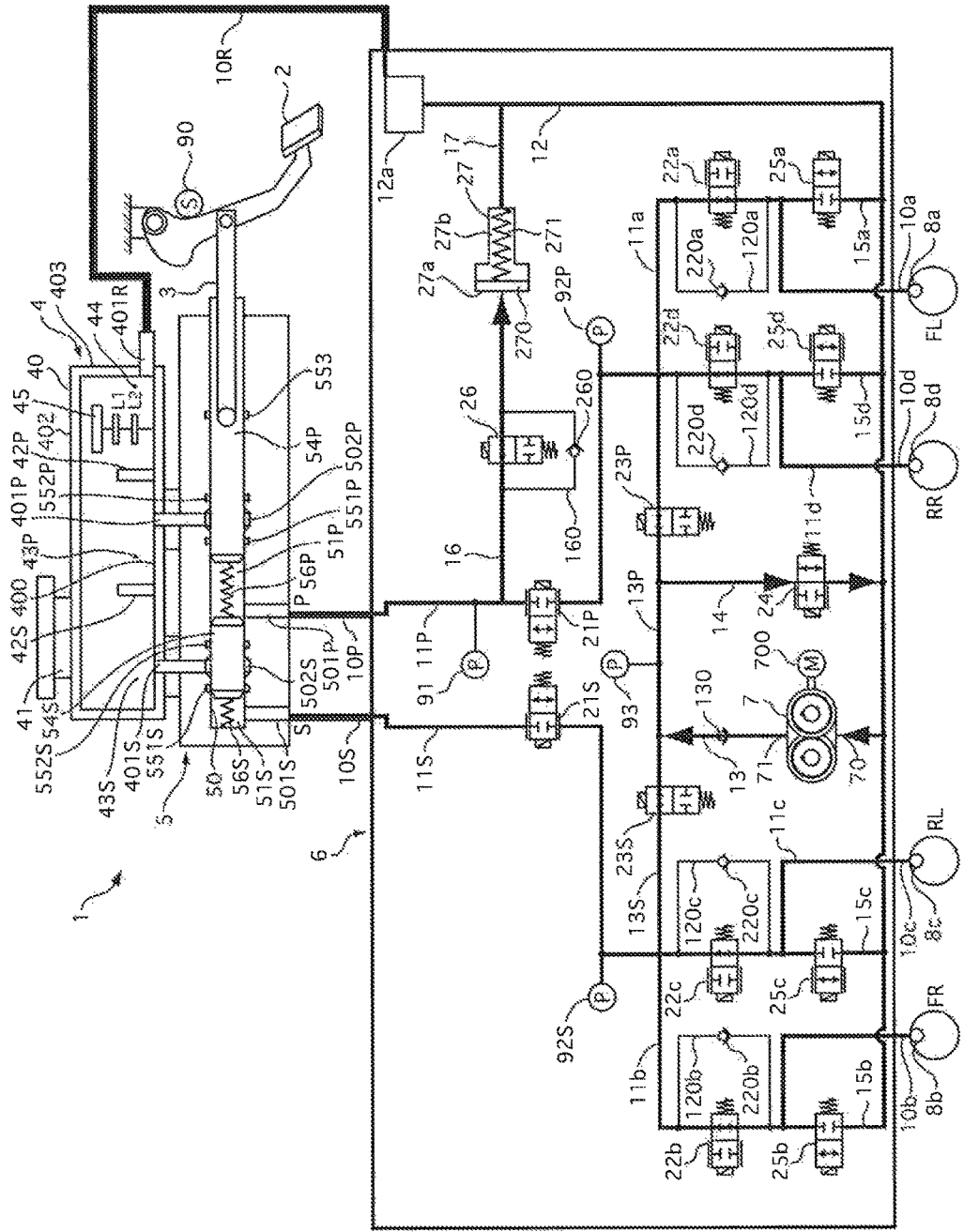
FIG. 5 illustrates an activation state at the time of boosting control performed by the brake apparatus according to the first embodiment.

FIG. 5 illustrates how the apparatus 1 operates at the time of the (two systems) boosting control performed by the boosting control unit 104. FIG. 5 illustrates the boosting control when the fluid level in the reservoir 4 reaches or exceeds the first fluid level L1 (at the time of the normal brake control in the narrow sense) as one example. The boosting control unit 104 controls the shut-off valves 21 and the pressure adjustment valve 24 in their respective valve-closing directions, controls the communication valves 23 and the stroke simulator valve 26 in their respective valve-opening directions, drives the motor 700 to activate the pump 7, and inactivates (stops the power supply to) the other actuators (the IN valves 22 and the OUT valves 25). When the pressure in the intake oil passage 12 reduces to a predetermined low pressure (matches or falls below generally the atmospheric pressure) due to the activation of the pump 7, the brake fluid is supplied from the second storage chamber 44 of the reservoir 4 toward the pump 7 (the intake portion 70) via the intake oil passage 12. During this boosting control, the value detected by the hydraulic sensor 92 can be regarded as generally corresponding to the wheel cylinder pressures in each of the systems, whereby the hydraulic sensor 92 functions as a wheel cylinder pressure sensor, which detects the wheel cylinder pressures in each of the systems. The present embodiment can reduce the number of sensors in the apparatus 1 by using the single hydraulic sensor 92 provided for each of the systems as the wheel cylinder pressure sensor in this manner without providing a hydraulic sensor capable of detecting the hydraulic pressure in the wheel cylinder 8 for each of the wheel cylinders 8. By this configuration, the present embodiment can simplify the apparatus 1, reduce the size of the apparatus 1, and cut down the cost of the apparatus i.

The apparatus 1 performs control (feedback control) in such a manner that the wheel cylinder pressures match the target hydraulic pressures by controlling the valve-opening state of the pressure adjustment valve 24 (the opening degree and a valve-opening time of the pressure adjustment valve 24), and the number of times that the pump 7 (the motor 700) rotates (the amount discharged by the pump) based on the values detected by the hydraulic sensors 92 and 93. The apparatus 1 controls the shut-off valves 21 in their respective valve-closing directions to block the communication between the master cylinder side where the master cylinder 5 is located and the wheel cylinder side where the wheel cylinders 8 are located, which facilitates controlling the wheel cylinder pressures independently of the brake operation performed by the driver. In the present embodiment, basically, the apparatus 1 controls the wheel cylinder pressures by finely controlling the activation state of the pressure adjustment valve 24 instead of the pump 7 (the motor 700). The proportional control valve is used as the pressure adjustment valve 24, which allows the apparatus 1 to conduct further fine control, thereby realizing smooth control of the wheel cylinder pressures. The apparatus 1 may be configured to control the wheel cylinder pressures by controlling the OUT valves 25 instead of the pressure adjustment valve 24 (or together with the pressure adjustment valve 24). Further, the apparatus 1 may be configured to stop the pump 7 when reducing or maintaining the wheel cylinder pressures. Further, in the present embodiment, the apparatus i uses the pump 7 as the hydraulic source, but may use not only the pump 7 but also, for example an accumulator that accumulates the brake fluid with use of a power source.

Opening the stroke simulator valve 26 causes the brake fluid flowing out of the master cylinder 5 according to the pedal pressing operation performed by the driver to be introduced into the stroke simulator 27. By this supply of the brake fluid, the apparatus 1 can create the pedal stroke and thus imitate the feeling that the driver would have when operating the brake pedal 2, thereby improving the feeling at the time of the pedal pressing operation, even when controlling the wheel cylinder pressures independently of the brake operation performed by the driver. The brake fluid is returned from the stroke simulator 27 into the master cylinder 5 by the operation of returning the pressed pedal by the driver. One possible situation that may occur while the stroke simulator 27 is in operation in this manner is that the stroke simulator valve 26 is closed due to, for example, a failure in the power source, so that the brake fluid is confined in the positive-pressure chamber 27a. However, the bypass oil passage 160 and the check valve 260 can return the brake fluid in the stroke simulator 27 (the positive-pressure chamber 27a) to the first oil passage 11P even with the stroke simulator valve 26 closed. Therefore, the present embodiment can prevent or reduce such a risk that the brake fluid falls short on the master cylinder side where the master cylinder 5 is located by an amount as much as the brake fluid confined in the positive-pressure chamber 27a, thereby becoming insufficient to increase the pressures in the wheel cylinders 8 again.

Next, functional advantages of the reservoir fluid amount reduction stop/cut-down control will be described. The wheel cylinder pressures may reduce due to such a failure that the brake fluid in the apparatus 1 leaks outwardly (the fluid leak). However, the apparatus 1 capable of performing the control of continuing the supply of the brake fluid toward the wheel cylinders 8 with use of the pump 7, like the present embodiment, may be able to allow the wheel cylinder pressures to less reduce at least as a whole of the plurality of wheels FL to RR set as control targets. For example, suppose that the fluid leaks outwardly from the oil passage 11*d* (the brake pipe 10*d*) in communication with the wheel cylinder 8*d* on some wheel such as the wheel RR. In this case, the apparatus 1 controls the activation state of each of the actuators including the pump 7 to achieve the target hydraulic pressure of each of the wheel cylinders 8*a* to 8*d* regardless of the above-described fluid leak. As a result, the wheel cylinder pressure does not reduce so much on the other wheel FL belonging to the same P system as the wheel RR corresponding to the oil passage 11*d* where the fluid leaks, not mention that the wheel cylinder pressures do not reduce on the wheels FR and RL of the S system where the fluid does not leak in the oil passages. Therefore, the wheel cylinder pressures on the four wheels FL to RR (the braking forces corresponding thereto) less deviate from the target hydraulic pressures as a whole of them. Further, an amount of the leak of the brake fluid is limited to some degree by a pipe resistance against the flow of the brake fluid due to the fluid leak, such as an orifice effect of the electronic valve (the IN valve 22*d* or the like) provided in the oil passage 11*d*. More specifically, because a differential pressure across the electromagnetic valve 22*d* or the like increases (the electromagnetic valve 22*d* or the like exerts the orifice function) in response to an increase in the flow amount of the brake fluid leaking outwardly from the oil passage 11*d*, the brake fluid is confined in the apparatus 1 to some degree. This confinement further cuts down the amount of the reduction in the wheel cylinder pressure. This cut-down lowers a risk of the reduction in the braking force due to the fluid leak to some degree.

However, on the other hand, this configuration may make it difficult to detect the occurrence of the fluid leak and locate the portion where this fluid leak has occurred by detecting the change in the hydraulic pressure for the same reason as the above-described reason for which the reduction in the wheel cylinder pressure is cut down. More specifically, the pressure in the failed system where the fluid leaks (the system including the oil passage where the fluid leaks) is also controlled to a value close to the target hydraulic pressure for the above-described reason. Therefore, in the case where the hydraulic sensor 92 provided for each of the systems is used as the wheel cylinder pressure sensor without the wheel cylinders 8 provided with the hydraulic sensor capable of detecting the hydraulic pressure therein for each of the wheel cylinders 8, like the present embodiment, the hydraulic sensor 92 in the failed system outputs a lower detected value than the target hydraulic pressure only by a small amount, or does not exhibit a very large difference between the value detected by the hydraulic sensor 92 of the failed system and the value detected by the hydraulic sensor 92 of the normal system where the fluid does not leak (a difference in the detected value between the systems). Therefore, the fluid leak may be unable to be easily detected by an attempt to detect the occurrence of the fluid leak and the portion where the fluid leaks based on this reduction in the hydraulic pressure or this differential pressure unless a special detection control law is set up. Especially, when the fluid leaks only by a tiny amount, this leak is extremely difficult to be detected with use of the change in the hydraulic pressure (the differential pressure).

Therefore, in consideration of the above-described circumstances, the apparatus 1 according to the present embodiment is configured to detect the occurrence of the fluid leak by detecting the change in the fluid level in the reservoir 4. Further, the apparatus 1 according to the present embodiment additionally sets a failed system detection control law, and is configured to locate the portion where the fluid leaks (the failed system) by executing this control law. This configuration allows the apparatus 1 to easily detect the occurrence of the fluid leak and locate the portion where this fluid leak has occurred. More specifically, the apparatus 1 determines that the fluid may leak upon detecting that the fluid level in the reservoir 4 falls below the first fluid level L1. Further, at this time, the apparatus 1 detects (identifies) in which system the fluid leaks in the oil passage, the P system or the S system, by confining the brake in the oil passages for each of the P and S systems and detecting in which system the hydraulic pressure reduces, as the failed system detection control.

Then, the lower side of the interior of the reservoir 4 is divided into the first storage chamber 43 and the second storage chamber 44 by the first partition wall 42P. Therefore, even when the vehicle is positioned on a slope surface or an acceleration or deceleration is applied to the vehicle, the apparatus 1 prevents or reduces occurrence of uneven distribution of the brake fluid in the reservoir 4. As a result, the apparatus 1 can eliminate or reduce a possibility of insufficiency of the brake fluid replenished from the reservoir 4 into the master cylinder 5 and the brake fluid supplied into the pump 7 due to the above-described uneven distribution. Further, the interior of the reservoir 4 is divided into the first storage chamber 43 and the second storage chamber 44, by which the apparatus 1 can prevent or cut down simultaneous reductions in the brake fluid replenished from the reservoir 4 into the master cylinder 5 and the brake fluid supplied into the pump 7 even when the fluid level in the reservoir 4 reduces (the brake fluid amount in the reservoir 4 reduces). Further, the first storage chamber 43 is further divided into the two storage chambers 43P and 43S by the second partition wall 42S. By this configuration, the apparatus 1 can achieve similar functional advantages to the above-described functional advantages.

On the other hand, when the fluid level in the reservoir 4 falls below the first fluid level L1, this fall is highly likely developed into a situation where the fluid level reduces to a lower position than the upper end of the first partition wall 42P. Under this situation, the flow of the brake fluid between the first storage chamber 43 and the second storage chamber 44 is blocked by the first partition wall 42P. Therefore, even when the brake fluid is returned from the brake pipe 10R into the second storage chamber 44 via the replenishment port 401R, this brake fluid cannot be transmitted into the first storage chamber 43. In other words, the brake fluid discharged from the wheel cylinders 8 into the reservoir 4 stops being replenished into the master cylinder 5. Further, if the brake control continues with the fluid leaking, this may result in individually independent falls (reductions) of the fluid levels (the brake liquid amounts) in the first storage chamber 43 and the second storage chamber 44. More specifically, at the time of the pressing force brake control, the fluid level in the first storage chamber 43 reduces due to the fluid leak because the brake fluid in the first storage chamber 43 is used at this time. In particular, the brake fluid in the first storage chambers 43P and 43S is consumed and reduces by an amount as large as insufficiency (the leaked fluid) of the brake fluid amounts returned from the wheel cylinders 8 to the first and second hydraulic chambers 51P and 51S compared to the brake fluid amounts transmitted from the first and second hydraulic chambers 51P and 51S toward the wheel cylinders 8 according to the activation of the master cylinder 5 between before and after this activation. On the other hand, at the time of the boosting control, the fluid level in the second storage chamber 44 reduces due to the fluid leak because the brake fluid in the second storage chamber 44 is used at this time. In particular, the brake liquid in the second storage chamber 44 is consumed and reduces by an amount as large as insufficiency (the leaked fluid) of the brake fluid amount returned to the second storage chamber 44 via the intake oil passage 12 compared to the brake fluid amount transmitted from the second storage chamber 44 to the wheel cylinders 8 via the intake oil passage 12 according to the activation of the pump 7 at the time of this activation. Therefore, continuing the brake control with the fluid leaking may result in the individual separate reductions in the wheel cylinder pressure (the braking force) generated by the master cylinder 5 with use of the brake fluid in the reservoir 4 and the wheel cylinder pressure (the braking force) generated by the pump 7, depending on what kind of control is performed. In particular, continuing the normal brake control with the fluid leak detected without any measures taken therefor may result in insufficiency or deterioration of the brake performance thereof, i.e., the deceleration with respect to the amount of the operation performed on the brake pedal 2 (hereinafter referred to as a normal brake performance).

On the other hand, the apparatus 1 according to the present embodiment solves the above-described problem by performing the reservoir fluid amount reduction stop/cut-down control, which stops or cuts down the reduction in the brake fluid amount necessary for the brake control (the generation of the wheel cylinder pressures) as (a part of) the fail-safe control against the possibility of the detected fluid leak.

(i) First Reduction Stop/Cut-down Control

The apparatus 1 can improve the fail-safe performance by preferentially preventing or reducing a risk of the insufficiency of the deceleration (the wheel cylinder pressure generated by the master cylinder 5) in the pressing force brake control between the pressing force brake control and the boosting control constituting the normal brake control. More specifically, if the failed system cannot be determined (if the leaked fluid flows only by a small amount or at a stage before the result of the failed system detection control can be acquired) when the fluid level in the reservoir 4 is detected to fall below the first fluid level L1, the apparatus 1 prohibits (stops) the pressing force brake control and permits (performs) only the boosting control. By this prioritization, the apparatus I can stop or cut down the reduction in the brake fluid in the first storage chambers 43P and 43S that is used in the pressing force brake control due to the fluid leak, and therefore can prevent or cut down the reduction in the braking force generated by the pressing force brake control in advance. Therefore, the apparatus 1 can prevent or reduce the occurrence of the insufficiency of the brake performance at the time of the normal brake control, and therefore can improve the fail-safe performance. More specifically, immediately shifting to the pressing force brake control as the final fail-safe control when there is a possibility of the fluid leak may facilitate the reduction in the brake fluid in the first storage chambers 43P and 43S due to the fluid leak, making the pressing force brake ineffective at an early stage. On the other hand, at the time of the boosting control using the pump 7, even the occurrence of the fluid leak does not lead to a considerable reduction in the wheel cylinder pressures as a whole as described above, and less likely results in a significant reduction in the braking force. In other words, in the present embodiment, the apparatus 1 can continue the brake control by increasing the pressures in the wheel cylinders 8 with use of the pump 7 even with the fluid leaking. Therefore, the apparatus 1 is configured to perform the boosting control without immediately shifting to the pressing force brake as the final fail-safe control when the fluid level falls below the first fluid level L1 and the possibility of the fluid leak is detected. By this configuration, the apparatus 1 can stop or cut down at least the reduction in the brake fluid in the first storage chambers 43P and 43S that is used in the pressing force brake control due to the fluid leak (although the brake fluid in the second storage chamber 44 that is used in the boosting control may continue reducing). Therefore, the apparatus 1 can acquire the brake performance that is not so much different from the normal brake performance by performing the boosting control while securing the effectiveness of the pressing force brake (stopping the reduction in the braking force due to the pressing force brake control). Therefore, the apparatus 1 can acquire the stable brake performance. The apparatus 1 may be configured to prohibit the pressing force brake when the fluid level is detected to fall below a predetermined fluid level provided inside the first storage chambers 43P and 43S instead of the fall of the fluid level below the first fluid level L1. In other words, the first fluid level L1 may be set in the first storage chambers 43P and 43S (a position slightly lower than the first partition wall 42P). In the present embodiment, the first fluid level L1 is set to the position generally equal to or slightly higher than the upper end of the first partition wall 42P, which allows the fluid level sensor 45 to be set up in the second storage chamber side where the second storage chamber 44 is located and to be used as a single sensor that can detect whether the fluid level falls below the fluid levels L1 and L2. Therefore, the apparatus 1 can simplify the fluid level sensor 45 and reduce the size of the reservoir 4.

(ii) Second Reduction Stop/Cut-down Control

When the fluid level in the reservoir 4 further reduces and is detected to fall below the second fluid level L2, the apparatus 1 determines that it is difficult to continue the boosting control (increase the pressures in the wheel cylinders 8 with use of the pump 7), and prohibits (stops) the boosting control and acquires the braking force only by the pressing force brake control. In other words, the apparatus 1 can prevent or reduce the deterioration of the brake performance at the time of the normal brake control and improve the fail-safe performance by shifting to the pressing force brake control as the final fail-safe control. More specifically, when the fluid level falls below the second fluid level L2, air is mixed in the brake fluid introduced by the pump 7 and this mixed brake fluid is discharged to the wheel cylinder side where the wheel cylinders 8 are located, which weakens the effect of the brake (including the pressing force brake control). Therefore, the apparatus 1 ends the boosting control before the fluid level in the reservoir 4 (the second storage chamber 44) reduces so much that the air starts to be mixed in the brake fluid introduced by the pump 7. By this operation, the apparatus 1 can prevent or cut down a reduction in the brake fluid in the second reservoir chamber 44 due to the fluid leak more than that, and therefore can prevent or reduce the entry of the air into the brake fluid on the wheel cylinder side where the wheel cylinders 8 are located. On the other hand, the apparatus 1 also stops or cuts down the reduction in the brake fluid in the first storage chambers 43P and 43S that is used in the pressing force brake control up to this time as described above. Therefore, the apparatus 1 can secure the effectiveness of this pressing force brake when finally shifting to the pressing force brake control. Further, the apparatus 1 can further reliably secure the braking force by the pressing force brake control by preventing or reducing the weakening of the effect of the brake due to the mixed air (the reduction in the wheel cylinder pressures generated according to the strokes of the pistons 54 of the master cylinder 5). In other words, the apparatus 1 prevents the air from being mixed into the brake fluid supplied to the wheel cylinder side where the wheel cylinders 8 are located while maintaining the normal brake performance by performing the boosting control until the fluid level falls below the second fluid level L2 as described above. By this operation, the apparatus 1 can stop or cut down the reduction in the braking force during the above-described boosting control and after the brake is switched to the pressing force brake. Therefore the apparatus 1 can acquire the stable brake performance and improve the fail-safe performance.

(iii) Failed System Detection and Single System Boosting Control

When the fluid level in the reservoir 4 is detected to fall below the first fluid level L1, the apparatus I identifies (determines) the portion where the fluid leaks (the failed system) by performing the failed system detection control. By this detection, the apparatus 1 can proceed to a next operation (action). More specifically, if the failed system can be determined (if the fluid leak flows by an amount that is not small, or at a stage after the result of the failed system detection control can be acquired), the apparatus 1 performs the single system boosting control, which is the boosting control using only the normal system, as a part of the fail-safe control. This configuration allows the apparatus 1 to continuously perform the boosting control using the pump 7 and also secure further a reliable braking force by using the normal system. Therefore, the apparatus 1 can prevent or reduce the deterioration of the normal brake performance, and acquire the stable brake performance. The apparatus 1 can stop or cut down the reduction in the brake fluid in the first storage chambers 43P and 43S due to the fluid leak by performing the single system boosting control (refraining from performing the pressing force brake control), and therefore can acquire similar functional advantages to them described in the above item (i). Further, when the fluid level is detected to fall below the second fluid level L2, the apparatus 1 ends the single system boosting control and shifts to the pressing force brake control, and therefore can acquire similar functional advantages to them described in the above item (ii). Even when being unable to identify the position where the fluid leaks and perform the fail-safe control according thereto (the single system boosting control), the apparatus 1 can efficiently use the brake fluid in the reservoir 4 and increase a total time period during which the braking force can be effectively generated (the brake can work well) by performing the reservoir fluid amount reduction stop/cut-down control described in the above items (i) and (ii), compared to when not performing this control (for example, when immediately shifting to the pressing force brake as the final fail-safe control when the fluid level in the reservoir 4 falls below the first fluid level L1).

Figure 6:
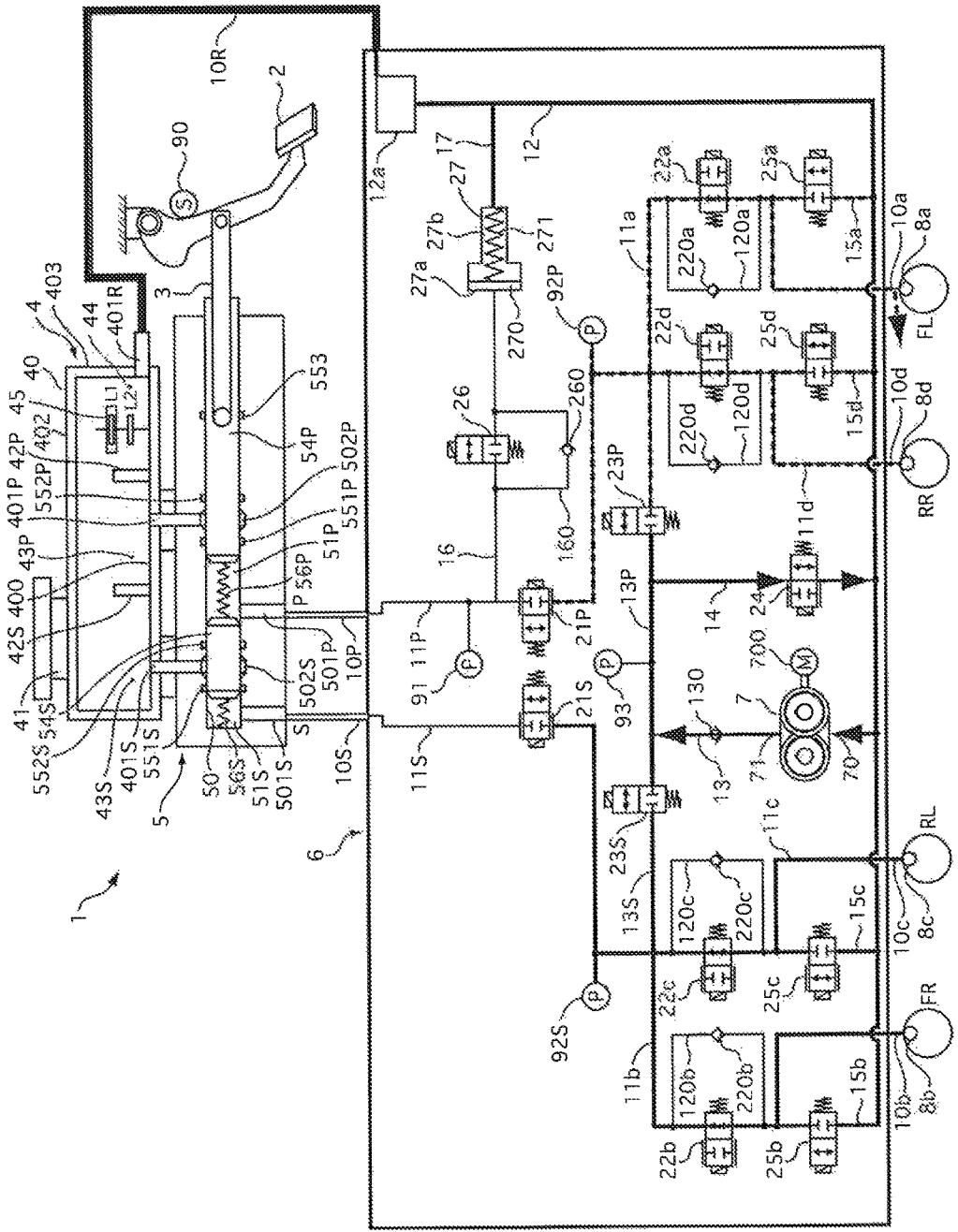
FIG. 6 illustrates an activation state at the time of the failed system detection control performed by the brake apparatus according to the first embodiment.

Now, specific operations of the failed system detection control and the single system boosting control will be described. FIG. 6 illustrates how the apparatus 1 operates at the time of the control performed by the failed system detection control unit 106. FIG. 6 illustrates the apparatus 1 performing the detection control when the fluid level in the reservoir 4 falls below the first fluid level L1 and the driver is not pressing the brake pedal 2 with the fluid leaking in the oil passage (the brake pipe 10a) of the P system. The failed system detection control unit 106 controls the shut-off valves 21 and the pressure adjustment valve 24 in their respective valve-closing directions and inactivates (stops the power supply to) the other actuators (the IN valves 22, the communication valves 23, the OUT valves 25, and the stroke simulator valve 26) while driving the motor 700 to keep the pump 7 activated. In the S system, the oil passages respectively in communication with the wheel cylinders 8b and 8c are closed between the shut-off valve 21S, the communication valve 23S, and the OUT valves 25b and 25c. Therefore, the hydraulic pressure in this portion is confined, so that the hydraulic pressures in the wheel cylinders 8b and 8c of the S system are maintained and do not reduce. On the other hand, in the P system, the oil passages respectively in communication with the wheel cylinders 8a and 8d are also closed between the shut-off valve 21P, the communication valve 23P, and the OUT valves 25a and 25d, but the hydraulic pressures in the wheel cylinders 8a and 8d of the P system reduce due to the occurrence of the fluid leak in the brake pipe 10a connected to the wheel cylinder 8a. The failed system detection control unit 106 detects that the fluid leaks in the oil passage of the P system by detecting the reductions in the hydraulic pressures in the wheel cylinders 8a and 8d of the P system based on the value detected by the hydraulic sensor 92P (or the difference between this value and the value detected by the hydraulic sensor 92S). The confinement of the hydraulic pressure, i.e., the stop of the supply of the brake fluid from the pump 7 results in the notably produced reduction in the hydraulic pressure of the system where the fluid leaks, thereby facilitating the detection of the fluid leak. As the leaked fluid flows by a larger amount, the reduction in the hydraulic pressure can be detected easier. The failed system detection control unit 106 returns the brake fluid discharged by the pump 7 to the intake oil passage 12 at an appropriate timing by controlling the valve-opening state of the pressure adjustment valve 24 based on the value detected by the hydraulic sensor 93. More specifically, the failed system detection control unit 106 maintains the valve-opening state (for example, the opening degree) of the pressure adjustment valve 24 immediately before controlling the communication valves 23 in their respective valve-closing directions (step S42), while detecting the reductions in the hydraulic pressures (steps S43 to S47 illustrated in FIG. 3). After determining whether a failure has occurred, the failed system detection control unit 106 controls the pressure adjustment valve 24 in such a manner that the pressure adjustment valve 24 is gradually opened (for example, the opening degree gradually increases) until the wheel cylinder pressures reduce to zero (step S48).

Figure 7:
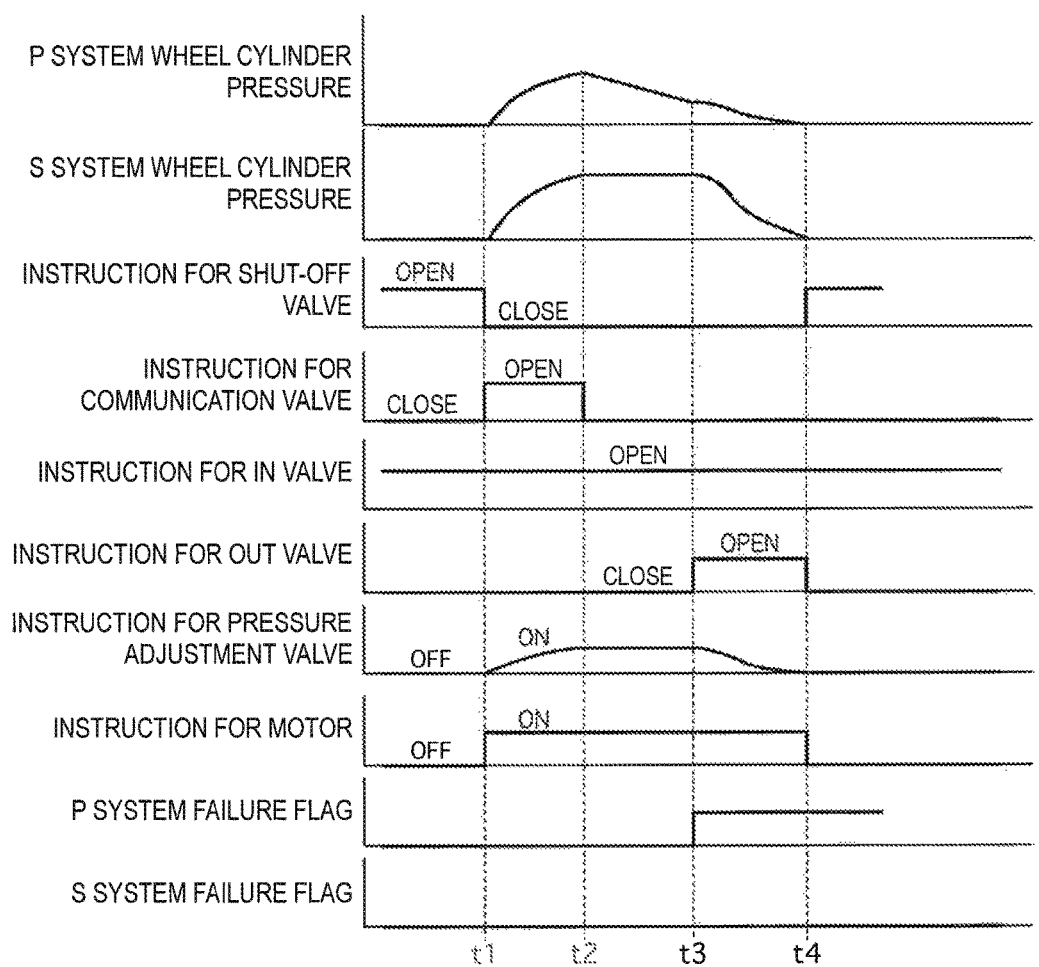
FIG. 7 is a timing diagram indicating a change over time in each of hydraulic pressures and actuator instruction values at the time of the failed system detection control performed by the brake apparatus according to the first embodiment.

FIG. 7 is a timing diagram indicating a change over time in each of the hydraulic pressures and actuator instruction values (the activation states) at the time of the control performed by the failed system detection control unit 106. Before time t1, the driver does not press the brake pedal 2. Each of the actuators (the IN valves 22, the communication valves 23, the pressure adjustment valve 24, the OUT valves 25, the stroke simulator valve 26, and the motor 700) are inactivated (no power is supplied thereto). Both the hydraulic pressures in the wheel cylinders 8a and 8d of the P system (hereinafter referred to as the P system wheel cylinder pressure) and the hydraulic pressures in the wheel cylinders 8b and 8c of the S system (hereinafter referred to as the S system wheel cylinder pressure), which are detected by the hydraulic sensors 92, are zero. At time t1, the failed system detection control unit 106 starts the detection control. The failed system detection control unit 106 outputs instructions for driving the shut-off valves 21 and the pressure adjustment valve 24 in their respective valve-closing directions, instructions for driving the communication valves 23 in their respective valve-opening direction, and instructions for driving the motor 700 (step S41 illustrated in FIG. 3). As a result, the pressures in the wheel cylinders 8 on the four wheels increase, and therefore the P system wheel cylinder pressure and the S system wheel cylinder pressure increase. At time t2, the P system wheel cylinder pressure and the S system wheel cylinder pressure increase to reach a predetermined value, whereby the failed system detection control unit 106 controls the communication valves 23 in their respective valve-closing directions, thereby confining the brake fluid (the pressures) in the wheel cylinders 8 on the four wheels for each of the systems (step S42). At time t3 when a predetermined time period has elapsed from time t2, because the P system wheel cylinder pressure falls below the predetermined threshold value, the failed system detection control unit 106 determines that the failure of the fluid leak has occurred in the oil passage of the P system. More specifically, the failed system detection control unit 106 sets a P system failure flag. On the other hand, because the S system wheel cylinder pressure is kept at the predetermined threshold value or higher, whereby the failed system detection control unit 106 determines that no failure has occurred in the oil passage of the S system. More specifically, the failed system detection control unit 106 does not set an S system failure flag (steps S43 to S44). After time t3, the failed system detection control unit 106 outputs instructions for driving the OUT valves 25 in their respective valve-opening direction. As a result, the P system wheel cylinder pressure and the S system wheel cylinder pressure reduce. Further, the failed system detection control unit 106 outputs instructions for gradually driving the pressure adjustment valve 24 in its valve-opening direction (step S48). At time t4, the P system wheel cylinder pressure and the S system wheel cylinder pressure reduce to zero. Upon this reduction, the failed system detection control unit 106 inactivates (stops the power supply to) each of the actuators (closes the OUT valves 25), and ends the detection control (step S49).

Figure 8:
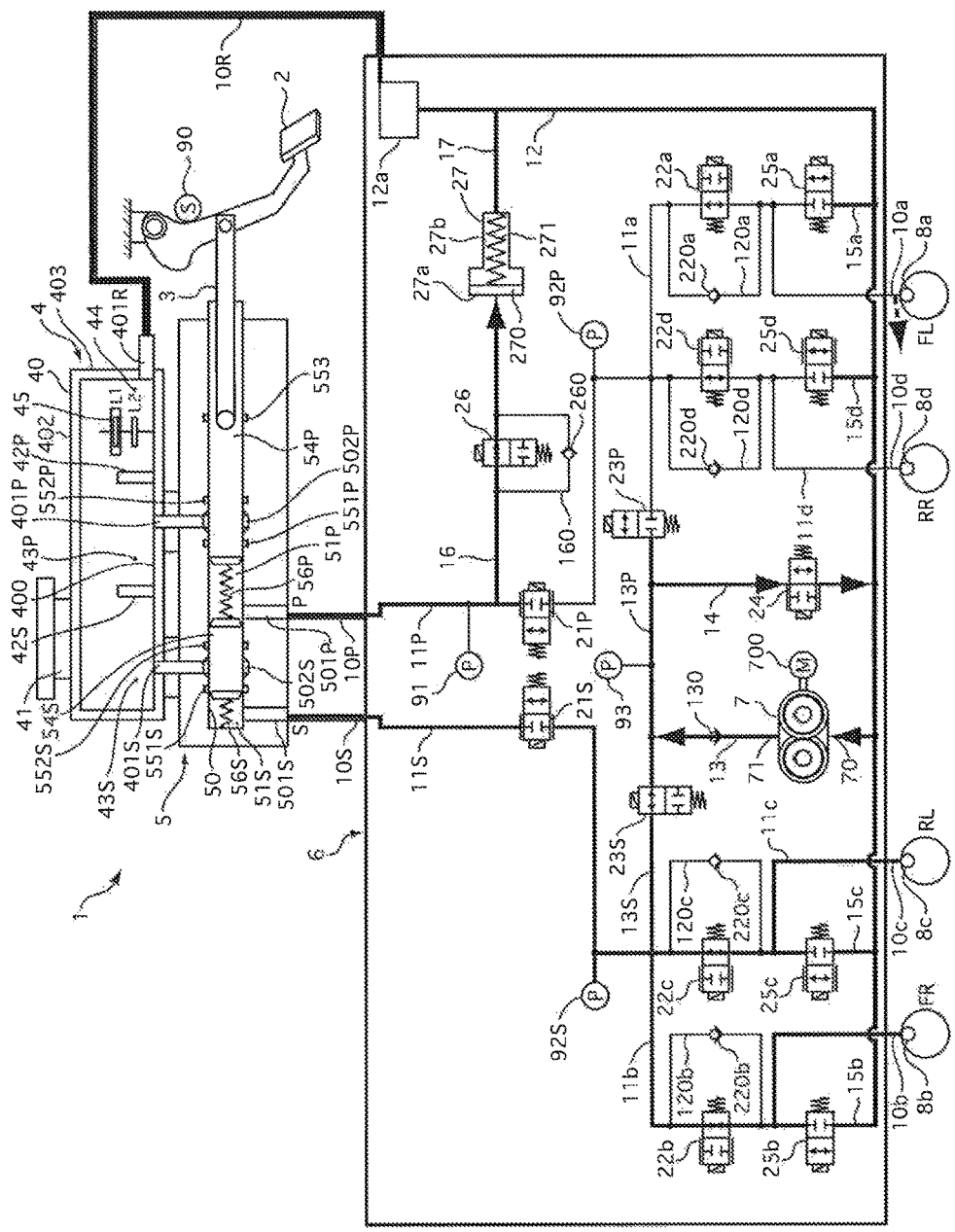
FIG. 8 illustrates an activation state at the time of single system boosting control performed by the brake apparatus according to the first embodiment.

FIG. 8 illustrates how the apparatus 1 operates at the time of the single system boosting control performed by the single system boosting control unit 108. FIG. 8 illustrates the apparatus 1 performing the single system boosting control according to the brake operation performed by the driver when the fluid leak is detected in the oil passage 11*a* (the brake pipe 10*a*) of the P system similarly to FIG. 6. The single system boosting control unit 108 controls the communication valve 23P in its valve-closing direction with respect to the P system where the fluid leak is detected. The activation states of the other actuators (in the both systems) are similar to the two systems boosting control performed by the boosting control unit 104. The control of the shut-off valve 21P and the communication valve 23P of the P system in their respective valve-closing directions blocks the communication between the oil passage 11*a* (the brake pipe 10*a*) of the P system where the fluid leak is detected, and the master cylinder 5 and the pump 7, which are the hydraulic sources. Therefore, this control prevents or reduces the leak of the brake fluid from the portion where the fluid leaks more than that. On the other hand, the single system boosting control unit 108 controls the communication valve 23S in its valve-opening direction with respect to the S system where the fluid leak is not detected, which establishes the communication between the pump 7 and the oil passage 11S of the S system. The single system boosting control unit 108 controls the valve-opening state of the pressure adjustment valve 24 and the number of times that the pump 7 rotates based on the values detected by the hydraulic sensors 92S and 93, thereby performing control so that the hydraulic pressures in the wheel cylinders 8*b* and 8*c* of the S system match the target hydraulic pressures. The S system is a normal system where the fluid does not leak, whereby the pressures in the wheel cylinders 8*b* and 8*c* can be further correctly controlled. Therefore, the apparatus 1 can further reliably acquire the braking force. The employed configuration is not limited to the X-type dual circuit configuration, and may be another pipe configuration, such as a front/rear split pipe configuration.

Besides that, the apparatus I can also continue the boosting control (increasing and reducing the wheel cylinder pressures) using the pump 7 with use of the fluid pool 12*a* as the source from which the brake fluid is supplied or the destination to which the brake fluid is discharged, even at the time of occurrence of such a failure that the brake fluid leaks from the intake oil passage 12 at the pipe 10R. Therefore, the apparatus 1 can acquire the stable brake performance and improve the fail-safe performance. The fluid pool 12*a* is provided above the hydraulic unit 6, whereby the apparatus 1 can further effectively acquire this effect. The volume of the fluid pool 12*a* is arbitrarily set to a value that allows the brake control to continue to some extent in light of the above-described intended usage. Further, the provision of the second simulator oil passage 17 allows the stroke simulator 27 (the back-pressure chamber 27*b*) to also function as the source from which the brake fluid is supplied and the destination to which the brake fluid is discharged (the fluid pool) similar to the above-described source and the destination, at the time of the failure that has occurred in the above-described manner, and therefore can further improve the fail-safe performance. The back-pressure chamber 27*b* of the stroke simulator valve 26 does not necessarily have to be in communication with the intake oil passage 12. For example, the apparatus 1 may be configured in such a manner that the back-pressure chamber 27*b* is directly opened to the low pressure (the atmospheric pressure). Further, the provision of the normally-closed communication valves 23 allows the brake hydraulic systems of the both systems to operate independently of each other even at the time of a power failure and thus allows the both systems to increase the wheel cylinder pressures by the pedal pressing force independently of each other, and therefore can improve the fail-safe performance.

[Advantageous Effects of First Embodiment]

In the following description, advantageous effects brought about by the brake apparatus 1 according to the first embodiment will be listed.

(A1) The brake apparatus 1 according to the first embodiment includes the master cylinder 5 configured to be activated according to the brake operation performed by the driver, the reservoir 4 (a reservoir tank) divided into at least the first storage chamber 43 (a first chamber) connected to the wheel cylinder 8 via the master cylinder 5 and the second storage chamber 44 (a second chamber) connected to the pump 7 (a hydraulic source) configured to increase the pressure of the brake fluid and transmit the brake fluid to the wheel cylinder 8, the ECU 100 (a brake control unit) configured to perform the brake control of transmitting the brake fluid to the wheel cylinder 8, and the fluid level sensor 45 (a fluid level detection unit) configured to detect the fluid level of the brake fluid in the reservoir 4. The ECU 100 is provided so as to be able to perform the pressing force brake control (first brake control) of transmitting the brake fluid from the first storage chamber 43 to the wheel cylinder 8 with use of the master cylinder 5, thereby increasing the pressure in this wheel cylinder 8, and the boosting control (second brake control) of transmitting the brake fluid in the second storage chamber 44 to the wheel cylinder 8 with use of the pump 7, thereby increasing the pressure in this wheel cylinder 8. The ECU 100 switches the brake control between the pressing force brake control and the boosting control according to the fluid level detected by the fluid level sensor 45.

Therefore, the brake apparatus 1 according to the first embodiment can switch the control according to the fluid level, and therefore can acquire the stable brake performance.

(A2) The ECU 100 (the brake control unit) performs the boosting control (the second brake control) if the fluid level detected by the fluid level sensor 45 (the fluid level detection unit) is detected to fall below the first fluid level L1, and performs the pressing force brake control (the first brake control) if the fluid level in the second storage chamber 44 that is detected by the fluid level sensor 45 is detected to fall below the second fluid level L2, which is lower than the first fluid level L1.

Therefore, the brake apparatus 1 according to the first embodiment can switch the control according to the fluid level, and therefore can acquire the stable brake performance.

(A3) The ECU 100 (the brake control unit) performs the pressing force brake control (the first brake control) if the brake operation is detected to be performed by the driver, and stops the pressing force brake control (the first brake control) if the fluid level detected by the fluid level sensor 45 (the fluid level detection unit) is detected to fall below the first fluid level L1.

Therefore, the brake apparatus 1 according to the first embodiment can acquire the stable brake performance because switching the control according to the fluid level.

(A4) The hydraulic source is the pump 7.

Therefore, the brake apparatus 1 according to the first embodiment can continue the brake control by increasing the pressure with use of the pump 7.

(A5) The pump 7 (the hydraulic source) introduces the brake fluid therein via the fluid pool 12a having the predetermined volume. The fluid pool 12a is provided between the reservoir 4 (the reservoir tank) and the pump 7 (the intake portion 70).

Therefore, the brake apparatus 1 according to the first embodiment can introduce the brake fluid from the fluid pool 12a even when a failure has occurred, and therefore can continues the braking using the pump 7 (the hydraulic source) for a further long time.

(A6) The first storage chamber 43 (the first chamber) is connected to the primary system oil passage 11P, which supplies the pressures to the predetermined wheel cylinders 8a and 8d, and a secondary system oil passage 11S, which supplies the pressures to the other wheel cylinders 8b and 8c, via the master cylinder 5. The ECU 100 (the brake control unit) includes the failed system detection control unit 106 (a fluid leak estimation unit) configured to estimate in which system the fluid leaks, the primary system oil passage 11P or the secondary system oil passage 11S, when the fluid level detected by the fluid level sensor 45 (the fluid level detection unit) is detected to fall below the first fluid level L1.

Therefore, the brake apparatus 1 according to the first embodiment can proceed to a next action by estimating the system where the fluid leaks, and therefore can improve the fail-safe performance.

(A7) The first storage chamber 43 (the first chamber) is further divided into the two chambers 43P and 43S, and the individual chambers 43P and 43S are connected to the primary system oil passage 11P and the secondary system oil passage 11S via the master cylinder 5, respectively. The ECU 100 (the brake control unit) stops the boosting control (the second brake control) using the oil passage of the system where the failed system detection control unit 106 (the fluid leak estimation unit) estimates that the fluid leaks, and continues the boosting control using the oil passage of the other system.

Therefore, the brake apparatus 1 according to the first embodiment can acquire the stable brake performance by continuing the boosting using one of the systems.

(A8) The inside of the reservoir 4 (the reservoir tank) is divided into the first storage chamber 43 (the first chamber) and the second storage chamber 44 (the second chamber) by the first partition wall 42P provided so as to protrude by the predetermined length upwardly from an inner wall of the reservoir 4 (the bottom portion 400) that would become the lower surface when the reservoir 4 is mounted on the vehicle. The first fluid level L1 is set to the position equal to or higher than the predetermined length upwardly from the inner wall. The second fluid level L2 is set to the position in the second storage chamber 44.

Therefore, the brake apparatus 1 according to the first embodiment switches the control based on the relationship between the fluid level and the storage chambers 43 and 44, and therefore can acquire the stable brake performance.

(A9) The first storage chamber 43 (the first chamber) is further divided into the two chambers 43P and 43S, and the individual chambers 43P and 43S are connected to the primary system oil passage 11P, which supplies the pressures to the predetermined wheel cylinders 8a and 8d, and the secondary system oil passage 11S, which supplies the pressures to the other wheel cylinders 8b and 8c, via the master cylinder 5, respectively.

Therefore, the brake apparatus 1 according to the first embodiment can guarantee the effectiveness of the pressing force brake with respect to the wheels of each of the systems.

(A10) The fluid level sensor 45 (the fluid level detection unit) detects the fluid level in the second storage chamber 44 (the second chamber).

Therefore, the brake apparatus 1 according to the first embodiment detects the fluid level in the second storage chamber 44 to switch the control, and therefore can continue the brake control (the boosting control) by increasing the pressure with use of the pump 7 for as a long time period as possible.

(B1) The brake apparatus 1 according to the first embodiment includes the master cylinder 5 configured to increase the pressure in the wheel cylinder 8 by being activated according to the brake operation performed by the driver, the reservoir 4 (the reservoir tank) divided into at least the first storage chamber 43 (the first chamber) connected to the wheel cylinder 8 via the master cylinder 5 and the second storage chamber 44 (the second chamber) connected to the pump 7 (the hydraulic source) configured to increase the pressure of brake fluid and transmit the brake fluid to the wheel cylinder 8, and the reservoir fluid level detection unit 105 (the fluid level detection unit) configured to detect whether the amount of the brake fluid in the reservoir 4 falls below the plurality of fluid levels L1 and L2 preset in the reservoir 4. If the amount of the brake fluid in the reservoir 4 is detected to fall below the fluid level L1 or L2 by the reservoir fluid level detection unit 105, the brake apparatus 1 changes a method for increasing the pressure in the wheel cylinder 8 between a method of increasing the pressure by the pump 7 with use of the brake fluid in the second storage chamber 44 and a method of increasing the pressure by the master cylinder 5 according to the brake operation performed by the driver with use of the brake fluid in the first storage chamber 43, according to the fluid level that the amount of the brake fluid in the reservoir 4 falls below.

Therefore, the brake apparatus 1 according to the first embodiment changes the method for increasing the pressure in the wheel cylinder 8 according to the fluid level, and therefore can acquire the stable brake performance.

(C1) The brake apparatus 1 according to the first embodiment includes the master cylinder 5 configured to be activated according to the brake operation performed by the driver, the reservoir 4 (the reservoir tank) divided into at least the first storage chamber 43 (the first chamber) connected to the wheel cylinder 8 via the master cylinder 5 and the second storage chamber 44 (the second chamber) connected to the pump 7 configured to increase the pressure of the brake fluid and transmit the brake fluid to the wheel cylinder 8, and the fluid level sensor 45 (the fluid level detection unit) configured to detect the fluid level of the brake fluid in the reservoir 4. When the brake operation is performed by the driver, the brake apparatus 1 increases the pressure in the wheel cylinder 8 with use of the brake fluid in the first storage chamber 43 by the hydraulic pressure in the master cylinder 5 that is generated according to the amount of this brake operation. The brake apparatus 1 stops increasing the pressure in the wheel cylinder 8 using the brake fluid in the first storage chamber 43, and increases the pressure in the wheel cylinder 8 by the pump 7 with use of the brake fluid in the second storage chamber 44, during the brake operation, if the fluid level detected by the fluid level sensor 45 is detected to match the first fluid level L1. The brake apparatus 1 stops increasing the pressure in the wheel cylinder 8 using the brake fluid in the second storage chamber 44, and increases the pressure in the wheel cylinder 8 with use of the brake fluid in the first storage chamber 43 according to the brake operation performed by the driver, if the fluid level in the second storage chamber 44 that is detected by the fluid level sensor 45 is detected to match the first fluid level L2, which is lower than the first fluid level L1.

Therefore, the brake apparatus 1 according to the first embodiment switches the method for increasing the pressure in the wheel cylinder 8 according to the fluid level, and therefore can acquire the stable brake performance.

(D1) The brake apparatus 1 according to the first embodiment includes the master cylinder 5 configured to be activated according to the brake operation performed by the driver, the reservoir 4 (the reservoir tank) divided into at least the first storage chamber 43 (the first chamber) connected to the wheel cylinder 8 via the master cylinder 5 (the hydraulic chamber 51 thereof) and the second storage chamber 44 (the second chamber) connected (without being connected via the hydraulic chamber 51 of the master cylinder 5) to the pump 7 (the hydraulic source) configured to increase the pressure of the brake fluid and transmit the brake fluid to the wheel cylinder 8, the ECU 100 (the brake control unit) configured to perform the brake control of transmitting the brake fluid to the wheel cylinder 8, and the fluid level sensor 45 (the fluid level detection unit) configured to detect the fluid level of the brake fluid in the reservoir 4. The ECU 100 performs the first reduction stop/cut-down control, which stops or cuts down the reduction in the brake fluid in the first storage chamber 43, if the fluid level in the first storage chamber 43 that is detected by the fluid level sensor 45 is detected to fall below the first fluid level L1 (a predetermined fluid level).

Therefore, the brake apparatus 1 according to the first embodiment prevents the occurrence of the reduction in the braking force generated by the pressing force brake control according to the fluid level, and therefore can acquire the stable brake performance.

(D2) The ECU 100 (the brake control unit) performs, according to the brake operation performed by the driver, the pressing force brake control (the first brake control), which is the brake control using at least the brake fluid in the first storage chamber 43 (the first chamber), if the fluid level in the first storage chamber 43 that is detected by the fluid level sensor 45 (the fluid level detection unit) is not detected to fall below the first fluid level L1 (the predetermined fluid level).

Therefore, the brake apparatus 1 according to the first embodiment can reduce energy consumption for driving the hydraulic source.

(D3) The first reduction stop/cut-down control is the control that prohibits the brake control using the brake fluid in the first storage chamber 43 (the first chamber) (the first brake control), and permits the brake control using the brake fluid in the second storage chamber 44 (the second chamber) (the second brake control), while the driver is performing the brake operation.

Therefore, the brake apparatus 1 according to the first embodiment can acquire the stable brake performance due to the second brake control while stopping or cutting down the reduction in the brake fluid in the first storage chamber 43 due to the pressing force brake control.

(D4) The ECU 100 (the brake control unit) performs the second reduction stop/cut-down control, which stops or cuts down the reduction in the brake fluid in the second storage chamber 44 (the second chamber), if the fluid level in the second storage chamber 44 that is detected by the fluid level sensor 45 (the fluid level detection unit) is detected to fall below the second fluid level L2.

Therefore, the brake apparatus 1 according to the first embodiment prevents or reduces the inclusion of the air into the brake fluid on the wheel cylinder side where the wheel cylinders 8 are located according to the fluid level, and therefore can acquire the stable brake performance.

(D5) The second reduction stop/cut-down control is the control that prohibits the brake control using the brake fluid in the second storage chamber 44 (the second chamber) (the second brake control), and permits the brake control using the brake fluid in the first storage chamber 43 (the first chamber) (the first brake control), while the driver is performing the brake operation.

Therefore, the brake apparatus 1 according to the first embodiment can acquire the stable brake performance due to the pressing force brake control while stopping or cutting down the reduction in the brake fluid in the second storage chamber 44 due to the second brake control.

[Second Embodiment]

Figure 9:
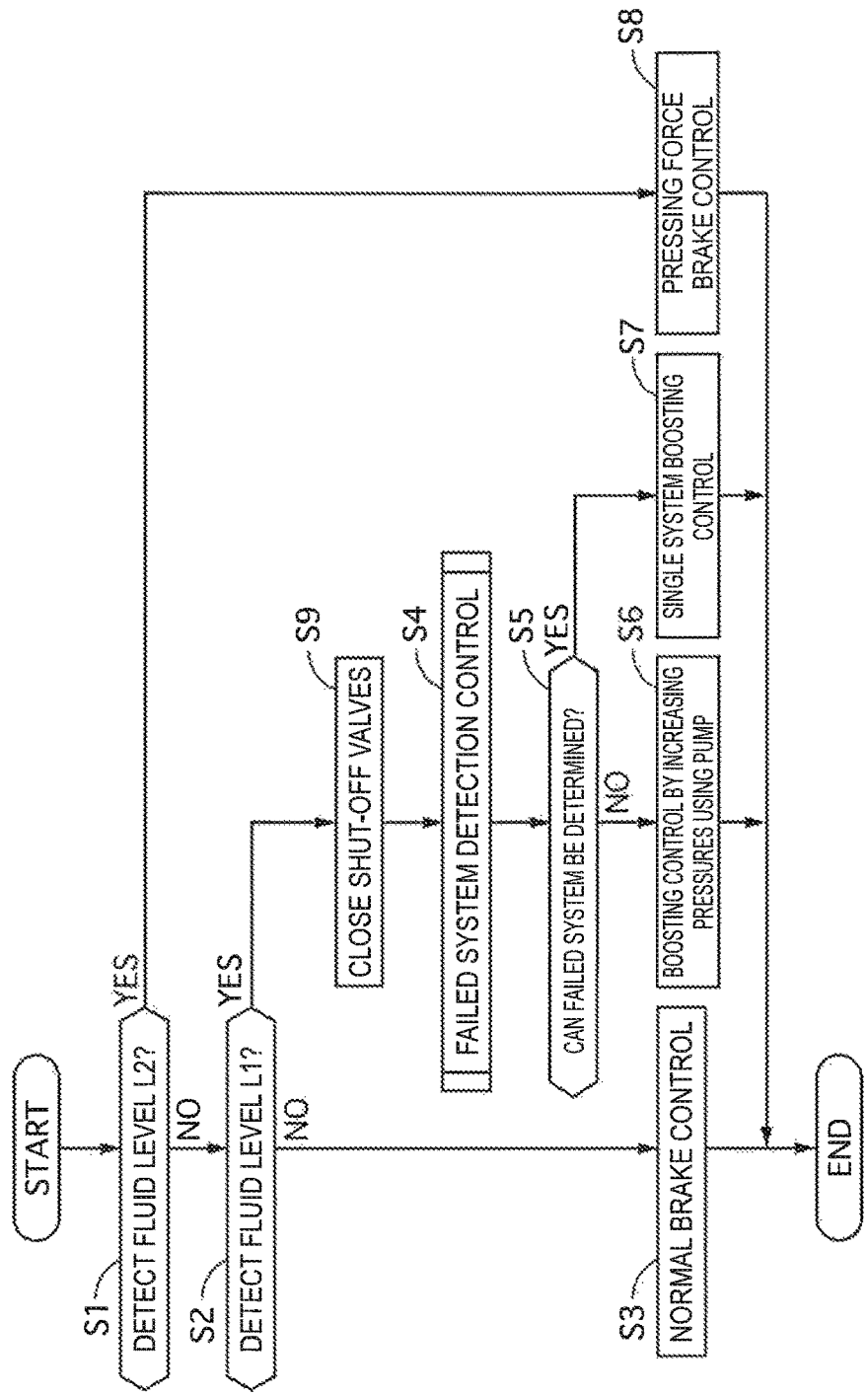
FIG. 9 is a flowchart illustrating a flow of control performed by a brake apparatus according to a second embodiment.

The brake apparatus 1 according to a second embodiment is configured to reliably stop or cut down the reduction in the brake fluid in the first storage chamber 43 by controlling the shut-off valves 21 in their respective valve-closing directions as a part of the fail-safe control, when the fluid level in the reservoir 4 is detected to fall below the first fluid level L1. FIG. 9 is a flowchart similar to FIG. 2 that illustrates an overview of a flow of control performed by the ECU 100 according to the present embodiment. If the reservoir fluid level detection unit 105 detects that the fluid level in the reservoir 4 falls below the first fluid level L1 in step S2, the processing proceeds to step S9. In step S9, the fail-safe control unit 100*b* controls the shut-off valves 21P and 21S of the both systems in their respective valve-closing directions. After that, the processing proceeds to step S4. Flows and configurations of other control procedures are similar to the first embodiment, and therefore will not be described here.

In other words, when the fluid level in the reservoir 4 is detected to fall below the first fluid level L1 yet be equal to or higher than the second fluid level L2, the brake apparatus 1 according to the second embodiment controls the shut-off valves 21 in their respective valve-closing directions constantly, i.e., not only while the driver is performing the brake operation like the first embodiment, but also while the driver is not performing the brake operation (while the hydraulic unit 6 is out of operation in the first embodiment). The brake apparatus 1 according to second embodiment constantly controls the shut-off valves 21 in their respective valve-closing directions in this manner, and therefore can prevent or reduce the leak from the portion where the fluid leaks to the outside of the apparatus 1 due to transmission of the brake fluid in the first storage chamber 43 through inside the oil passages 11 toward the wheel cylinder side where the wheel cylinders 8 are located via the shut-off valves 21 with the aid of the force of gravity and the like. As a result, the brake apparatus 1 according to the second embodiment can further effectively stop or cut down the reduction in the brake fluid in the first storage chamber 43 due to the fluid leak, and therefore can improve the above-described advantageous effects brought about by the reservoir fluid amount reduction stop/cut-down control (the first reduction stop/cut-down control) according to the first embodiment, which aims at the prevention of the reduction in the braking force generated by the pressing force brake control. Besides that, the brake apparatus 1 according to the second embodiment acquires similar advantageous effects to the first embodiment due to the similar configuration to the first embodiment.

(D6) The brake apparatus 1 according to the second embodiment includes the shut-off valve 21 for switching the communication and the blockage of the oil passage 11 connecting the master cylinder 5 (the hydraulic chamber 51 thereof) and the wheel cylinder 8 to each other, and the first reduction stop/cut-down control is the control that controls the shut-off valve 21 in its valve-closing direction regardless of whether the driver is performing the brake operation.

Therefore, the brake apparatus 1 according to the second embodiment can further reliably prevent the occurrence of the reduction in the braking force generated by the pressing force brake control.

[Other Embodiments]

Having described how the present invention can be embodied based on exemplary embodiments, the specific configuration of the present invention is not limited to the exemplary embodiments, and the present invention also include a design modification and the like thereof made within a range that does not depart from the spirit of the present invention. For example, the brake apparatus to which the control according to the present invention is applied may be configured in any manner as long as this brake apparatus includes a master cylinder connected to a wheel cylinder via an oil passage, a hydraulic source connected to the wheel cylinder via a oil passage and capable of increasing a pressure in the wheel cylinder independently of the master cylinder, and a reservoir tank divided into a first chamber connected to the master cylinder and a second chamber connected to the hydraulic source, and is not limited to the brake apparatus described in the embodiments. For example, in the embodiments, the common passage is used as both the intake oil passage of the pump and the return oil passage for returning the brake fluid that is no longer necessary to the reservoir, but these passages may be provided separately. Further, the method for activating each of the actuators for controlling the wheel cylinder pressures is not limited to the method in the embodiments, and can be arbitrarily changed. Further, the embodiments have been described referring to the configuration that performs only the boosting control in addition to the pressing force brake control at the time of the normal brake control by way of example, but the control according to the present invention is also applicable to a configuration that performs the regenerative cooperative brake control or the like in addition or instead of the boosting control at the time of the normal brake control.

Further, embodiments of the present invention may also be configured in the following manner.

(First Embodiment)

A brake apparatus includes a master cylinder configured to be activated according to a brake operation performed by a driver, a reservoir tank divided into at least a first chamber connected to a wheel cylinder via the master cylinder and a second chamber connected to a hydraulic source configured to increase a pressure of brake fluid and transmit the brake fluid to the wheel cylinder, a brake control unit configured to perform brake control of transmitting the brake fluid to the wheel cylinder, and a fluid level detection unit configured to detect a fluid level of the brake fluid in the reservoir tank. The brake control unit is provided so as to be able to perform first brake control of transmitting the brake fluid from the first chamber to the wheel cylinder with use of the master cylinder, thereby increasing a pressure in the wheel cylinder, and second brake control of transmitting the brake fluid in the second chamber to the wheel cylinder with use of the hydraulic source, thereby increasing a pressure in the wheel cylinder. The brake control unit switches brake control between the first brake control and the second brake control according to the fluid level detected by the fluid level detection unit.

(Second Embodiment)

In the brake apparatus according to the first embodiment, the brake control unit performs the second brake control if the fluid level detected by the fluid level detection unit is detected to fall below a first fluid level. The brake control unit performs the first brake control if the fluid level in the second chamber that is detected by the fluid level detection unit is detected to fall below a second fluid level, which is lower than the first fluid level.

(Third Embodiment)

In the brake apparatus according to the second embodiment, the brake control unit performs the first brake control if the brake operation is detected to be performed by the driver. The brake control unit stops the first brake control if the fluid level detected by the fluid level detection unit is detected to fall below the first fluid level.

(Fourth Embodiment)

In the brake apparatus according to the second embodiment, the hydraulic source is a pump.

(Fifth Embodiment)

In the brake apparatus according to the first embodiment, the hydraulic source introduces the brake fluid therein via a fluid pool having a predetermined volume. The fluid pool is provided between the reservoir tank and the hydraulic source.

(Sixth Embodiment)

In the brake apparatus according to the first embodiment, the first chamber is connected to a primary system oil passage, which supplies the pressure to a predetermined wheel cylinder, and a secondary system oil passage, which supplies the pressure to another wheel cylinder, via the master cylinder. The brake control unit includes a fluid leak estimation unit configured to estimate in which system the fluid leaks, the primary system oil passage or the secondary system oil passage, when the fluid level detected by the fluid level detection unit is detected to fall below the first fluid level.

(Seventh Embodiment)

In the brake apparatus according to the sixth embodiment, the first chamber is further divided into two chambers, and the individual chambers are connected to the primary system oil passage and the secondary system oil passage via the master cylinder, respectively. The brake control unit stops the second brake control using the system oil passage where the fluid leak estimation unit estimates that the fluid leaks, and continues the second brake control using the other system oil passage.

(Eighth Embodiment)

In the brake apparatus according to the second embodiment, an inside of the reservoir tank is divided into the first chamber and the second chamber by a partition wall provided so as to protrude by a predetermined length upwardly from an inner wall of the reservoir tank that would become a lower surface when the reservoir tank is mounted on a vehicle. The first fluid level is set to a position equal to or higher than the predetermined length upwardly from the inner wall. The second fluid level is set to a position in the second chamber.

(Ninth Embodiment)

In the brake apparatus according to the eighth embodiment, the first chamber is further divided into two chambers, and the individual chambers are connected to a primary system oil passage, which supplies the pressure to a predetermined wheel cylinder, and a secondary system oil passage, which supplies the pressure to another wheel cylinder, via the master cylinder, respectively.

(Tenth Embodiment)

In the brake apparatus according to the first embodiment, the fluid level detection unit detects the fluid level in the second chamber.

(Eleventh Embodiment)

A brake apparatus includes a master cylinder configured to increase a pressure in a wheel cylinder by being activated according to a brake operation performed by a driver, a reservoir tank divided into at least a first chamber connected to the wheel cylinder via the master cylinder and a second chamber connected to a hydraulic source configured to increase a pressure of brake fluid and transmit the brake fluid to the wheel cylinder, and a fluid level detection unit configured to detect whether an amount of the brake fluid in the reservoir tank falls below a plurality of fluid levels preset in the reservoir tank. If the amount of the brake fluid in the reservoir tank is detected to fall below the fluid level by the fluid level detection unit, the brake apparatus changes a method for increasing the pressure in the wheel cylinder between a method of increasing the pressure by the hydraulic source with use of the brake fluid in the second chamber and a method of increasing the pressure by the master cylinder according to the brake operation performed by the driver with use of the brake fluid in the first chamber, according to the fluid level that the amount of the brake fluid in the reservoir tank falls below.

(Twelfth Embodiment)

In the brake apparatus according to the eleventh embodiment, the brake apparatus increases the pressure in the wheel cylinder by the hydraulic source with use of the brake fluid in the second chamber, if the amount of the brake fluid in the reservoir tank is detected to match or fall below a preset first fluid level by the fluid level detection unit. The brake apparatus stops increasing the pressure in the wheel cylinder by the hydraulic source with use of the brake fluid in the second chamber, and increases the pressure in the wheel cylinder by the master cylinder with use of the brake fluid in the first chamber according to the brake operation performed by the driver, if the amount of the brake fluid in the second chamber is detected to match or fall below a second fluid level, which is lower than the first fluid level, by the fluid level detection unit.

(Thirteenth Embodiment)

In the brake apparatus according to the eleventh embodiment, upon detecting that the brake operation is performed by the driver, the brake apparatus increases the pressure in the wheel cylinder with use of the brake fluid in the first chamber by a hydraulic pressure in the master cylinder that is generated according to an amount of the brake operation.

(Fourteenth Embodiment)

In the brake apparatus according to the thirteenth embodiment, the brake apparatus stops increasing the pressure in the wheel cylinder with use of the brake fluid in the first chamber, if the amount of the brake fluid in the reservoir tank is detected to match or fall below the first fluid level by the fluid level detection unit while the driver is performing the brake operation.

(Fifteenth Embodiment)

In the brake apparatus according to the fourteenth embodiment, the hydraulic source is a pump, and the brake apparatus is configured to increase the pressure in the wheel cylinder by the pump with use of the brake fluid in the second chamber.

(Sixteenth Embodiment)

In the brake apparatus according to the fifteenth embodiment, the first chamber is connected to a primary system oil passage, which supplies the pressure to a predetermined wheel cylinder, and a secondary system oil passage, which supplies the pressure to another wheel cylinder, via the master cylinder. The brake apparatus includes a fluid leak estimation unit configured to estimate in which system the fluid leaks, the primary system oil passage or the secondary system oil passage, when the amount of the brake fluid in the reservoir tank is detected to match or fall below the preset first fluid level by the fluid level detection unit.

(Seventeenth Embodiment)

In the brake apparatus according to the sixteenth embodiment, the first chamber is further divided into two chambers, and the individual chambers are connected to the primary system oil passage and the secondary system oil passage via the master cylinder, respectively. The brake apparatus stops increasing the pressure in the wheel cylinder by the hydraulic source with use of the brake fluid in the second chamber with respect to the system oil passage where the fluid leak estimation unit estimates that the fluid leaks, and continues increasing the pressure in the wheel cylinder by the hydraulic source with use of the brake fluid in the second chamber with respect to the other system oil passage.

(Eighteenth Embodiment)

A brake apparatus includes a master cylinder configured to be activated according to a brake operation performed by a driver, a reservoir tank divided into at least a first chamber connected to a wheel cylinder via the master cylinder and a second chamber connected to a pump configured to increase a pressure of brake fluid and transmit the brake fluid to the wheel cylinder, and a fluid level detection unit configured to detect a fluid level of the brake fluid in the reservoir tank. Upon detecting that the brake operation is performed by the driver, the brake apparatus increases a pressure in the wheel cylinder with use of the brake fluid in the first chamber by a hydraulic pressure in the master cylinder that is generated according to an amount of this brake operation. The brake apparatus stops increasing the pressure in the wheel cylinder with use of the brake fluid in the first chamber, and increases the pressure in the wheel cylinder by the pump with use of the brake fluid in the second chamber, during the brake operation, if the fluid level detected by the fluid level detection unit is detected to match a first fluid level. The brake apparatus stops increasing the pressure in the wheel cylinder with use of the brake fluid in the second chamber, and increases the pressure in the wheel cylinder with use of the brake fluid in the first chamber according to the brake operation performed by the driver, if the fluid level in the second chamber that is detected by the fluid level detection unit is detected to match a second fluid level, which is lower than the first fluid level.

(Nineteenth Embodiment)

In the brake apparatus according to the eighteenth embodiment, the first chamber is connected to a primary system oil passage, which supplies the pressure to a plurality of wheel cylinders, and a secondary system oil passage, which supplies the pressure to another wheel cylinder, via the master cylinder. The brake apparatus includes a fluid leak estimation unit configured to estimate in which system the fluid leaks, the primary system oil passage or the secondary system oil passage, when the fluid level detected by the fluid level detection unit is detected to match the first fluid level.

(Twentieth Embodiment)

In the brake apparatus according to the nineteenth embodiment, the first chamber is further divided into two chambers, and the individual chambers are connected to the primary system oil passage and the secondary system oil passage via the master cylinder, respectively. The brake apparatus stops increasing the pressure in the wheel cylinder by the pump with use of the brake fluid in the second chamber with respect to the system oil passage where the fluid leak estimation unit estimates that the fluid leaks, and continues increasing the pressure in the wheel cylinder by the pump with respect to the other system oil passage.

Having described how the present embodiment can be embodied based on several exemplary embodiments, the above-described embodiments of the present invention are intended to only facilitate the understanding of the present invention, and the present invention shall not be limited thereto. Needless to say, the present invention can be modified or improved without departing from the spirit of the present invention, and includes equivalents thereof. Further, the individual components described in the claims and the specification can be arbitrarily combined or omitted within a range that allows them to remain capable of achieving at least a part of the above-described objects or producing at least a part of the above-described advantageous effects.

This application claims priority to Japanese Patent Application No. 2014-61476 filed on Mar. 25, 2014. The entire disclosure of Japanese Patent Application No. 2014-61476 filed on Mar. 25, 2014 including the specification, the claims, the drawings, and the summary is incorporated herein by reference in its entirety.

REFERENCE SIGNS LIST 1 brake apparatus
4 reservoir tank
42P first partition wall
43 first storage chamber (first chamber)
44 second storage chamber (second chamber)
45 fluid level sensor (fluid level detection unit)
5 master cylinder
7 pump (hydraulic source)
8 wheel cylinder
11P primary system oil passage
11S secondary system oil passage
12a fluid pool
100 electronic control unit (brake control unit)
106 failed system detection control unit (fluid leak estimation unit).

The invention claimed is:

1. A brake apparatus comprising:
a master cylinder configured to be activated according to a brake operation performed by a driver;
a reservoir tank divided into at least a first chamber connected to a wheel cylinder via the master cylinder and a second chamber connected to a hydraulic source configured to increase a pressure of brake fluid and transmit the brake fluid to the wheel cylinder;
a brake control unit configured to perform brake control of transmitting the brake fluid to the wheel cylinder; and
a fluid level detection unit configured to detect a fluid level of the brake fluid in the reservoir tank, wherein
the brake control unit is provided so as to be able to perform first brake control of transmitting the brake fluid from the first chamber to the wheel cylinder with use of the master cylinder, thereby increasing a pressure in the wheel cylinder, and second brake control of transmitting the brake fluid in the second chamber to the wheel cylinder with use of the hydraulic source, thereby increasing a pressure in the wheel cylinder,
the brake control unit switches brake control between the first brake control and the second brake control according to the fluid level detected by the fluid level detection unit,
the brake control unit performs the second brake control if the fluid level detected by the fluid level detection unit is detected to fall below a first fluid level,
the brake control unit performs the first brake control if the fluid level in the second chamber that is detected by the fluid level detection unit is detected to fall below a second fluid level which is lower than the first fluid level
the brake control unit performs the first brake control if the brake operation is detected to be performed by the driver, and
while the brake operation is detected to be performed by the driver, the brake control unit stops the first brake control if the fluid level detected by the fluid level detection unit is detected to fall below the first fluid level.

2. The brake apparatus according to claim 1, wherein the hydraulic source is a pump.

3. The brake apparatus according to claim 1, wherein the hydraulic source introduces the brake fluid therein via a fluid pool having a predetermined volume, the fluid pool being provided between the reservoir tank and the hydraulic source.

4. The brake apparatus according to claim 1, wherein the first chamber is connected to a primary system oil passage, which supplies the pressure to a predetermined wheel cylinder, and a secondary system oil passage, which supplies the pressure to another wheel cylinder, via the master cylinder, and
wherein the brake control unit includes a fluid leak estimation unit configured to estimate in which system the fluid leaks, the primary system oil passage or the secondary system oil passage, if the fluid level detected by the fluid level detection unit is detected to fall below the first fluid level.

5. The brake apparatus according to claim 4, wherein the first chamber is further divided into two chambers, and the individual chambers are connected to the primary system oil passage and the secondary system oil passage via the master cylinder, respectively, and
wherein the brake control unit stops the second brake control using the system oil passage where the fluid leak estimation unit estimates that the fluid leaks, and continues the second brake control using the other system oil passage.

6. The brake apparatus according to claim 1, wherein an inside of the reservoir tank is divided into the first chamber and the second chamber by a partition wall provided so as to protrude by a predetermined length upwardly from an inner wall of the reservoir tank that would become a lower surface when the reservoir tank is mounted on a vehicle,
wherein the first fluid level is set to a position equal to or higher than the predetermined length upwardly from the inner wall, and
wherein the second fluid level is set to a position in the second chamber.

7. The brake apparatus according to claim 6, wherein the first chamber is further divided into two chambers, and the individual chambers are connected to a primary system oil passage, which supplies the pressure to a predetermined wheel cylinder, and a secondary system oil passage, which supplies the pressure to another wheel cylinder, via the master cylinder, respectively.

8. The brake apparatus according to claim 1, wherein the fluid level detection unit detects the fluid level in the second chamber.

9. A brake apparatus comprising:
a master cylinder configured to increase a pressure in a wheel cylinder by being activated according to a brake operation performed by a driver;
a reservoir tank divided into at least a first chamber connected to the wheel cylinder via the master cylinder and a second chamber connected to a hydraulic source configured to increase a pressure of brake fluid and transmit the brake fluid to the wheel cylinder; and
a fluid level detection unit configured to detect whether an amount of the brake fluid in the reservoir tank falls below a plurality of fluid levels preset in the reservoir tank, wherein
if the amount of the brake fluid in the reservoir tank is detected to fall below the fluid level by the fluid level detection unit, the brake apparatus changes a method for increasing the pressure in the wheel cylinder between a method of increasing the pressure by the hydraulic source with use of the brake fluid in the second chamber and between a method of increasing the pressure by the master cylinder according to the brake operation performed by the driver with use of the brake fluid in the first chamber, according to the fluid level that the amount of the brake fluid in the reservoir tank falls below,
upon detecting that the brake operation is performed by the driver, the brake apparatus increases the pressure in the wheel cylinder with use of the brake fluid in the first chamber by a hydraulic pressure in the master cylinder that is generated according to an amount of the brake operation, and
the brake apparatus stops increasing the pressure in the wheel cylinder with use of the brake fluid in the first chamber, if the amount of the brake fluid in the reservoir tank is detected to match or fall below the first fluid level by the fluid level detection unit while the driver is performing the brake operation.

10. The brake apparatus according to claim 9, wherein the brake apparatus increases the pressure in the wheel cylinder by the hydraulic source with use of the brake fluid in the second chamber, if the amount of the brake fluid in the reservoir tank is detected to match or fall below a preset first fluid level by the fluid level detection unit, and
wherein the brake apparatus stops increasing the pressure in the wheel cylinder by the hydraulic source with use of the brake fluid in the second chamber, and increases the pressure in the wheel cylinder by the master cylinder with use of the brake fluid in the first chamber according to the brake operation performed by the driver, if the amount of the brake fluid in the second chamber is detected to match or fall below a second fluid level, which is lower than the first fluid level, by the fluid level detection unit.

11. The brake apparatus according to claim 9, wherein the hydraulic source is a pump, and the brake apparatus is configured to increase the pressure in the wheel cylinder by the pump with use of the brake fluid in the second chamber.

12. The brake apparatus according to claim 11, wherein the first chamber is connected to a primary system oil passage, which supplies the pressure to a predetermined wheel cylinder, and a secondary system oil passage, which supplies the pressure to another wheel cylinder, via the master cylinder, and
wherein the brake apparatus includes a fluid leak estimation unit configured to estimate in which system the fluid leaks, the primary system oil passage or the secondary system oil passage, if the amount of the brake fluid in the reservoir tank is detected to match or fall below the preset first fluid level by the fluid level detection unit.

13. The brake apparatus according to claim 12, wherein the first chamber is further divided into two chambers, and the individual chambers are connected to the primary system oil passage and the secondary system oil passage via the master cylinder, respectively, and
wherein the brake apparatus stops increasing the pressure in the wheel cylinder by the hydraulic source with use of the brake fluid in the second chamber with respect to the system oil passage where the fluid leak estimation unit estimates that the fluid leaks, and continues increasing the pressure in the wheel cylinder by the hydraulic source with use of the brake fluid in the second chamber with respect to the other system oil passage.

\* \* \* \* \*